United States Patent [19]

Betensky

[11] Patent Number: 4,697,892
[45] Date of Patent: Oct. 6, 1987

[54] PROJECTION LENS

[75] Inventor: Ellis I. Betensky, New York, N.Y.

[73] Assignee: U.S. Precision Lens, Inc., Cincinnati, Ohio

[21] Appl. No.: 642,825

[22] Filed: Aug. 21, 1984

Related U.S. Application Data

[63] Continuation-in-part of Ser. No. 543,017, Oct. 18, 1983, abandoned.

[51] Int. Cl.[4] .......................... G02B 13/18; G02B 9/34
[52] U.S. Cl. ..................................... 350/432; 350/412; 350/469; 350/473
[58] Field of Search ................. 350/432, 412, 469, 473

[56] References Cited

U.S. PATENT DOCUMENTS

| | | | |
|---|---|---|---|
| 2,440,088 | 4/1948 | Grey | 350/453 |
| 2,468,564 | 4/1949 | Luneberg | 350/432 |
| 2,479,907 | 8/1949 | Cox | 350/432 |
| 2,502,543 | 4/1950 | Warmisham | 350/432 |
| 2,552,672 | 5/1951 | Grey | 350/432 |
| 2,638,034 | 5/1953 | Wreathall | 350/432 |
| 2,660,094 | 11/1953 | Wreathall | 350/432 |
| 2,737,849 | 3/1956 | Tiller | 350/464 |
| 3,429,997 | 2/1969 | Rosner et al. | 350/438 |
| 3,800,085 | 3/1974 | Ambats et al. | 350/420 |
| 3,868,173 | 2/1975 | Miles et al. | 350/432 |
| 3,951,523 | 4/1976 | Nishimoto | 350/432 |
| 3,998,527 | 12/1976 | Ikeda et al. | 350/432 |
| 4,300,817 | 11/1981 | Betensky | 350/412 |
| 4,348,081 | 9/1982 | Betensky | 350/412 |
| 4,530,575 | 7/1985 | Yamakawa | 350/412 X |
| 4,577,935 | 3/1986 | Yamakawa et al. | 350/412 X |

FOREIGN PATENT DOCUMENTS

| | | |
|---|---|---|
| 57-101812 | 6/1982 | Japan . |
| 57-108815 | 7/1982 | Japan . |
| 57-108818 | 7/1982 | Japan . |
| 57-177115 | 10/1982 | Japan . |
| 58-118616 | 7/1983 | Japan . |
| 58-125007 | 7/1983 | Japan . |
| 58-139110 | 8/1983 | Japan . |
| 58-139111 | 8/1983 | Japan . |
| 58-140708 | 8/1983 | Japan . |
| 59-121016 | 7/1984 | Japan . |
| 59-133517 | 7/1984 | Japan . |
| 59-133518 | 7/1984 | Japan . |
| 593514 | 10/1947 | United Kingdom ................ 350/412 |
| 1269133 | 4/1972 | United Kingdom . |

OTHER PUBLICATIONS

Cox; *A System of Optical Design;* Focal Press; 1965; pp. 470-482.

Primary Examiner—John K. Corbin
Assistant Examiner—Scott J. Sugarman
Attorney, Agent, or Firm—Costas, Montgomery & Dorman

[57] ABSTRACT

A projection lens for a cathode ray tube display which comprises from the image end, a first group of relatively weak optical power serving primarily to correct aperture dependent aberrations, a second group of strong positive power, and a third negative group having a strongly concave image side surface and which serves as a field flattener and to correct the Petzval curvature of the services of the elements of the other groups. The second group comprises two elements which provide substantially all of the positive power of the lens and which define an air meniscus therebetween with the minor dimension at the optical axis. The optical powers of the second group bear a predetermined ratio and have a minor dimension at the optical axis.

57 Claims, 3 Drawing Figures

PROJECTION LENS

RELATED APPLICATIONS

This application is a continuation-in-part of application Ser. No. 543,017 filed Oct. 18, 1983, now abandoned. This application may also be considered an improvement over the lenses disclosed in co-pending application Ser. No. 280,785, now U.S. Pat. No. 4,526,442.

FIELD OF THE INVENTION

This invention relates to projection lenses, and more particularly, relates to projection lenses for wide screen television systems.

BACKGROUND OF THE INVENTION

A preferred form of projection lenses for wide screen television is disclosed in U.S. Pat. Nos. 4,348,018 and 4,300,817 as well as co-pending U.S. application Ser. No. 280,785 now U.S. Pat. No. 4,526,442, all assigned to the assignee of the present application.

The lenses disclosed in the aforementioned patents and application generally comprise three groups: from the image end a first group of relatively small optical power serving to primarily correct aperture dependent aberrations; a second group which supplies substantially all the positive power of the lens; and a third group having a strongly concave surface towards the image end of the lens, serving as a field flattener, and essentially correcting any Petzval curvature of the first and second groups. As used in the foregoing mentioned patents, the term "lens group" refers to a combination of one or more lens elements which provide a specified optical function(s). In accordance with present U.S. Patent and Trademark Office practice, such lens groups are hereinafter referred to as "lens units" with the same meaning. The lenses, as disclosed, are designed for use with a surface of a cathode ray tube. The lenses of U.S. Pat. No. 4,300,817, disclosing a single biconvex element in the second lens unit, all have an equivalent focal length (EFL) of about one hundred fourteen millimeters or greater, while the lenses of U.S. Pat. No. 4,348,081, which utilize a two-element second lens unit including the biconvex element, may have reduced EFL's. The lenses described in U.S. Pat. No. 4,526,442 are designed to have a fold in the optical axis between the first and second lens units and have been designed so that the EFL is as low as one hundred fourteen millimeters. These EFL's are for cathode ray tube screens having a display surface with an approximate five inch diagonal.

Projection TV sets are rather bulky and require high volume cabinets. One manner of reducing the cabinet size is to to decrease the EFL of the projection lenses.

A further consideration is introduced wherein a spacing is provided between the screen of the CRT and the third lens unit of the projection lens. This spacing may be required for the inclusion of a liquid cooling material and a window necessary to enclose the coolant against the face of the CRT. This additional spacing between the face of the CRT causes the third negative element to contribute more negative power, which must be compensated by increased power in the positive second lens unit.

An effect of increasing the angular coverage of the lens as a result of decreasing the EFL, is that the aberrations become more difficult to correct. A single biconvex element second lens unit, as shown in the aforementioned patents, does not provide the lens designer adequate degrees of freedom to correct for the resulting astigmatism and distortion. By dividing the optical power of the second lens unit, as disclosed in U.S. Pat. No. 4,348,081, the EFL may be shortened. However, merely splitting the optical power of the second lens unit into two elements to obtain additional degrees of design freedom, does not provide acceptable contrast and resolution where the angular coverage of the projection lenses is required to be in excess of twenty-seven degrees semi-field.

The requirement that there be a fold in the optical axis between the first and second lens units to a mirror, as shown in the aforementioned co-pending application, requires that a large space be designed between the first and second lens units. This requirement further complicates the correction of astigmatism. In effect, the large air space between the first and second lens units eliminates a degree of design freedom, thus reducing contrast and resolution. The EFL of the lens is, of course, a function in the total conjugate distance between the CRT and the display screen. This is shown by the relationship $$OL = EFL(1 + 1/M) + EFL(1 + M)$$

where OL is the overall conjugate distance of the system from object to image
EFL $(1 + 1/M)$ is the object distance
EFL $(1 + M)$ is the image distance
and
M is the magification of the system expressed as the ratio of object height to image height.

Therefore, in order to decrease the total distance between the cathode ray tube and the screen, it is necessary to reduce the EFL.

The present invention overcomes the aforementioned problems by forming the second lens unit in a particular configuration which allows shortening the EFL of the Lens while providing the necessary correction.

SUMMARY OF THE INVENTION

Briefly stated, the invention comprises a projection lens comprising from the image end a corrector element of relatively small optical power, a second lens unit comprising two positive elements which define therebetween an air meniscus having a minor thickness dimension at the axis and a third lens unit which serves primarily as field flattener and corrects for the Petzval curvature of the other elements. In some embodiments, a distortion correction element of very weak optical power is included in the third lens unit to the image side of the field flattener.

The relationship of the powers of the elements of the second lens unit as well as the relationship of the curvatures of the facing elements of the second lens unit and the weak optical power corrector in the third lens unit, when used, are so selected as to contribute to the achievement of the necessary aberration correction and decrease in focal length.

An object of this invention is to provide a new and improved projection lens specifically designed for projection television systems.

Another object of this invention is to provide a projection television lens of the type described having a new and improved construction of the second lens unit which permits a wider field angle together with correction of the aberrations usually attendant with an increase in field angle.

The features of the invention which are believed to be novel are particularly pointed out and distinctly claimed in the concluding portion of this specification. The invention, however, both as to operation and organization, together with further objects and advantages thereof, may best be appreciated by reference to the drawings and the following detailed description.

DETAILED DESCRIPTION OF PREFERRED EMBODIMENTS OF THE INVENTION

Figure 1:
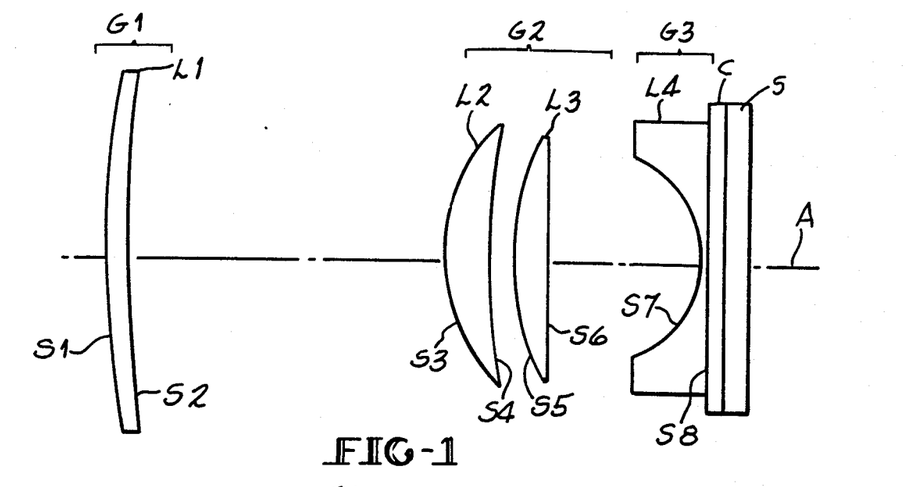
FIGS. 1, 2 and 3 are schematic side elevations of lenses embodying the invention.
Figure 2:
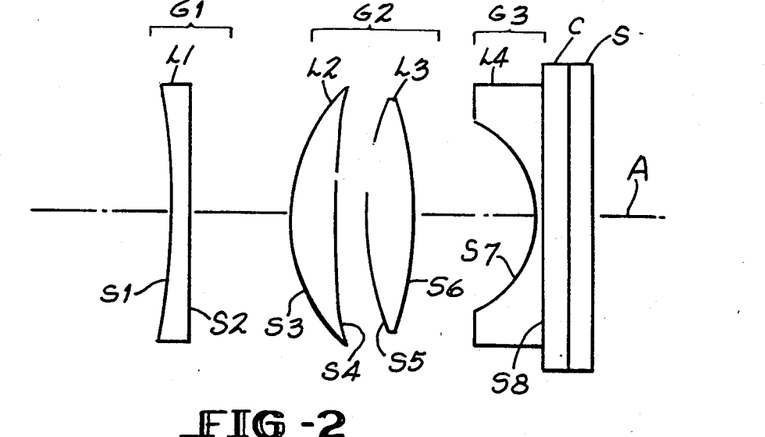

Lenses embodying the invention, as shown in FIGS. 1 and 2, comprise four elements, L1-L4, from the image end. A first lens unit G1, comprises element L1, which is of relatively weak optical power and serves primarily to correct for aperture dependent aberrations. A second lens unit G2 comprising the elements L2 and L3, which is overall biconvex, provides essentially all the positive power of the overall lens.

Figure 3:
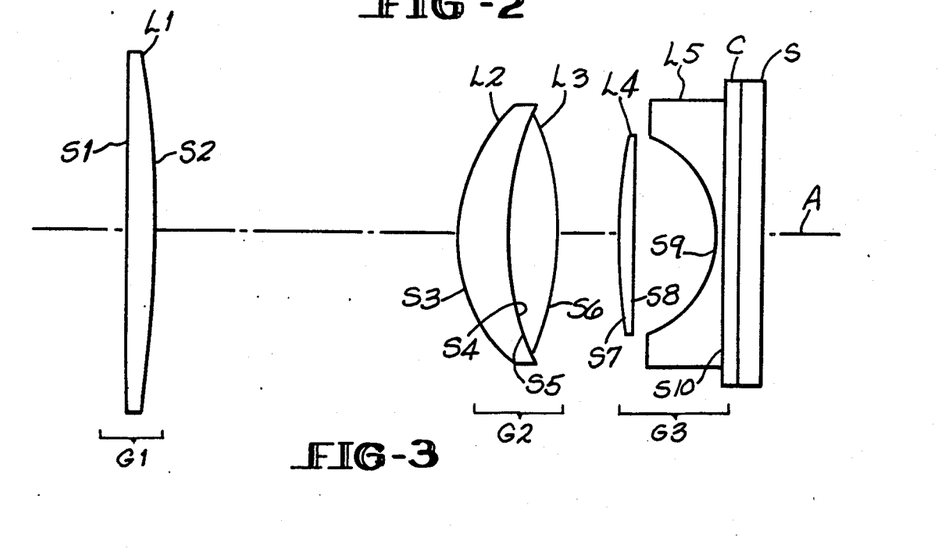

A third lens unit G3 comprising the element L4 in FIGS. 1 and 2 has a strongly concave image side surface and serves as a field flattener essentially correcting any Petzval curvature of the elements of the first and second lens units. The field flattening element L4 in FIGS. 1 and 2 and L5 in FIG. 3 is shown as in contact with a device C which contains a coolant for the screen S of a CRT. The liquid coolant in device C also serves as an optical coupler between the lenses and the CRT.

In large screen projection television systems, three CRT's are used, the CRT's being red, blue and green, and the system is aligned so that the image from each of the CRT's are superimposed to provide a full color image. The lenses hereinafter described are design for CRT's having an image diagonal of either four and a half or five inches.

The lenses of FIGS. 1 and 3 are designed to have their optical axis A folded by positioning a mirror in the airspace between the elements L1 and L2, as shown in co-pending application Ser. No. 280,785, while the lens shown in FIG. 2 is designed for direct projection and therefore has lesser air spacing between the elements L1 and L2.

The compactness of the design with a wider field angle is due to the construction of the second lens unit comprising elements L2 and L3.

There are criticalities in the design of the second lens unit comprising elements L2 and L3 which are necessary to obtain the desired performance. Specifically, the power $K_2$ of element L2 should bear a ratio to the power $K_3$ of the element L3 as follows:

$$2.0 > K_2/K_3 > 0.5$$

The power as exemplified by $K_2/K_3$ is the reciprocal of the EFL of each of the elements $L_2$ and $L_3$ in millimeters.

A further important consideration in the lens unit comprising elements $L_2$ and $L_3$ is that the surfaces S4 and S5, as set forth in all but Table VII, define a air meniscus having its smallest thickness at the optical axis and the ratio of the curvatures C4 and C5 of the facing surfaces S4 and S5, respectively, are $$1.0 > |C_4/C_5| > 0.01$$

The curvature of the surfaces is the reciprocal of the surface radii in millimeters at the optical axis.

Moreover, to achieve the necessary correction that the power of the second lens unit G2 bears, the following relationship to the power of the overall lens $$1.4 > K_{G2}/K_O > 0.8$$

where $K_{G2}$ is the optical power of the elements L2 and L3 as a lens unit expressed as the reciprocal in millimeters of the EFL of this lens unit and $K_O$ is the optical power of the overall lens expressed as the reciprocal in millimeters of the EFL of the overall lens.

Table XIX hereinafter sets forth the relative parameters of all of the lens lens units disclosed in FIGS. 1-3, and Tables I-IV.

The lens of FIG. 3 is similar to the lens of FIG. 1 with the addition of a thin corrector, having an aspheric surface, which is disposed between the second lens unit and the negative field flattening lens unit. This corrector, which is of weak optical power, serves to correct for distortion and may be considered to be part of the third lens unit G3.

Fifteen lenses, as shown in FIGS. 1-3, are hereinafter set forth and described in Tables I-XV. In the tables and in the drawings, the reference L followed by an Arabic numeral refers to a lens element, while the reference S followed by an Arabic numeral refers to lens sufaces, both from the image to object end. In the tables, the axial spacing between lens surfaces is given. All lens elements in the given examples which are acrylic have an index of refraction of 1,491, and a dispersion as expressed by their Abbe Number of 57.2.

Tables I-V describe lenses as shown in FIG. 1. Tables VI-XI disclose lenses as shown in FIG. 3, which is similar to that of FIG. 1 with the addition of a corrector element L4, having an aspheric surface, disposed between the strong positive lens unit G2 and the field flattener L5.

The lenses of FIGS. 1 and 3 and Tables I-V are designed to have the optical axes thereof folded by a mirror positioned between elements L1 and L2. Lenses as shown in FIG. 2 are described in Tables XII-XV. These lenses, which are of extremely short EFL, have all elements aligned on a non-folded optical axis.

Surfaces of all examples may be defined as aspheric in accordance with the equation $$X = \frac{Cy^2}{1 + \sqrt{1 - (1 + K) C^2 y^2}} + Dy^4 + Ey^6 + Fy^8 + Gy^{10}$$

where X is the surface sag at a semi-aperture distance Y from the axis A of the lens; C is the curvature of the lens surface at the optical axis A, equal to the reciprocal of the radius at the optical axis; and K is a conic constant of revolution.

In the Tables defining the lens, positive surface radii are struck from the right, and negative radii are struck from the left on the optical axis of the lens. The lens prescriptions, as given in Tables I-XIV, are for CRT's having a five inch diagonal, while the prescription of Taable XV is for a CRT having an image diagonal of 290 mm.

The index of refraction of each lens element is given by $N_d$, and the dispersion as measured by the Abbe number is $V_d$. The aspheric surfaces are utilized for correction purposes and therefore maintain the lens as a three group lens.

TABLE I

| LENS | SURFACE | RADIUS (mm) | AXIAL DISTANCE BETWEEN SURFACES (mm) | $N_d$ | $V_d$ |
|---|---|---|---|---|---|
| L1 | S1 | Plano | | | |
|  |  |  | 9.10 | 1.491 | 57.2 |
|  | S2 | −613.41 | | | |
|  |  |  | 122.00 | | |
| L2 | S3 | 69.79 | | | |
|  |  |  | 26.04 | 1.491 | 57.2 |
|  | S4 | 233.67 | | | |
|  |  |  | 2.06 | | |
| L3 | S5 | 117.08 | | | |
|  |  |  | 18.00 | 1.491 | 57.2 |
|  | S6 | −232.10 | | | |
|  |  |  | 61.98 | | |
| L4 | S7 | −51.79 | | | |
|  |  |  | 2.00 | 1.491 | 57.2 |
|  | S8 | Plano | | | |

| Aspheric Surfaces: S2, S4, S5, S7 | | | | |
|---|---|---|---|---|
|  | S2 | S4 | S5 | S7 |
| D | $.125 \times 10^{-6}$ | $.403 \times 10^{-6}$ | $-.648 \times 10^{-8}$ | $-.406 \times 10^{-5}$ |
| E | $-.190 \times 10^{-10}$ | $.116 \times 10^{-9}$ | $-.115 \times 10^{-10}$ | $.210 \times 10^{-8}$ |
| F | $.497 \times 10^{-14}$ | $-.180 \times 10^{-13}$ | $.141 \times 10^{-13}$ | $-.440 \times 10^{-12}$ |
| G | $-.399 \times 10^{-18}$ | $.595 \times 10^{-17}$ | $-.249 \times 10^{-17}$ | $-.106 \times 10^{-16}$ |
| K | 1.326 | −.010 | .010 | .010 |

EFL = 101.1 mm
Relative Aperture = 1.0

TABLE II

| LENS | SURFACE | RADIUS (mm) | AXIAL DISTANCE BETWEEN SURFACES (mm) | $N_d$ | $V_d$ |
|---|---|---|---|---|---|
| L1 | S1 | 403.31 | | | |
|  |  |  | 9.10 | 1.491 | 57.2 |
|  | S2 | 3045.20 | | | |
|  |  |  | 122.00 | | |
| L2 | S3 | 66.90 | | | |
|  |  |  | 22.32 | 1.491 | 57.2 |
|  | S4 | 431.31 | | | |
|  |  |  | 10.22 | | |
| L3 | S5 | 132.76 | | | |
|  |  |  | 12.70 | 1.491 | 57.2 |
|  | S6 | −469.26 | | | |
|  |  |  | 60.00 | | |
| L4 | S7 | −65.01 | | | |
|  |  |  | 2.00 | 1.491 | 57.2 |
|  | S8 | Plano | | | |

| Aspheric Surfaces: S2, S3, S6, S7 | | | | |
|---|---|---|---|---|
|  | S2 | S3 | S6 | S7 |
| D | $.100 \times 10^{-6}$ | $-.159 \times 10^{-6}$ | $.282 \times 10^{-6}$ | $-.752 \times 10^{-5}$ |
| E | $-.145 \times 10^{-10}$ | $-.200 \times 10^{-10}$ | $.122 \times 10^{-9}$ | $.480 \times 10^{-8}$ |
| F | $.406 \times 10^{-14}$ | $.327 \times 10^{-14}$ | $-.538 \times 10^{-13}$ | $-.182 \times 10^{-11}$ |
| G | $-.335 \times 10^{-18}$ | $-.258 \times 10^{-17}$ | $.111 \times 10^{-16}$ | $.166 \times 10^{-15}$ |
| K | 1.326 | .010 | .010 | .010 |

EFL = 104.3 mm
Relative Aperture 1.0

TABLE III

| LENS | SURFACE | RADIUS (mm) | AXIAL DISTANCE BETWEEN SURFACES (mm) | $N_d$ | $V_d$ |
|---|---|---|---|---|---|
| L1 | S1 | 324.07 | | | |
|  |  |  | 9.10 | 1.491 | 57.2 |
|  | S2 | 1415.0 | | | |
|  |  |  | 122.00 | | |
| L2 | S3 | 63.69 | | | |
|  |  |  | 22.35 | 1.491 | 57.2 |
|  | S4 | 308.43 | | | |
|  |  |  | 3.83 | | |
|  | S5 | 117.49 | | | |
| L3 |  |  | 13.07 | 1.491 | 57.2 |
|  | S6 | −421.74 | | | |
|  |  |  | 55.36 | | |
| L4 | S7 | −49.78 | | | |
|  |  |  | 2.00 | 1.491 | 57.2 |
|  | S8 | 52488.91 | | | |

| Aspheric Surfaces: S2, S3, S6, S7, S8 | | | | | |
|---|---|---|---|---|---|
|  | S2 | S3 | S6 | S7 | S8 |
| D | $.131 \times 10^{-6}$ | $-.861 \times 10^{-7}$ | $.401 \times 10^{-6}$ | $-.475 \times 10^{-5}$ | $-.395 \times 10^{-6}$ |
| E | $-.150 \times 10^{-10}$ | $.341 \times 10^{-10}$ | $.931 \times 10^{-10}$ | $.332 \times 10^{-8}$ | $.378 \times 10^{-9}$ |
| F | $.385 \times 10^{-14}$ | $.693 \times 10^{-14}$ | $-.568 \times 10^{-13}$ | $-.146 \times 10^{-11}$ | $-.128 \times 10^{-12}$ |
| G | $-.156 \times 10^{-18}$ | $-.418 \times 10^{-17}$ | $.120 \times 10^{-16}$ | $.891 \times 10^{-16}$ | $.272 \times 10^{-16}$ |
| K | 1.326 | .010 | .010 | .010 | 0.010 |

EFL = 102.79 mm
Relative Aperture = 1.0

TABLE IV

| LENS | SURFACE | RADIUS (mm) | AXIAL DISTANCE BETWEEN SURFACES (mm) | $N_d$ | $V_d$ |
|---|---|---|---|---|---|
| L1 | S1 | Plano | | | |
|  |  |  | 9.10 | 1.491 | 57.2 |
|  | S2 | −491.74 | | | |
|  |  |  | 122.00 | | |
| L2 | S3 | 68.16 | | | |
|  |  |  | 26.04 | 1.491 | 57.2 |
|  | S4 | 267.01 | | | |
|  |  |  | 5.88 | | |
| L3 | S5 | 126.40 | | | |
|  |  |  | 18.00 | 1.491 | 57.2 |
|  | S6 | −242.22 | | | |
|  |  |  | 58.04 | | |
| L4 | S7 | −51.21 | | | |
|  |  |  | 2.00 | 1.491 | 57.2 |
|  | S8 | Plano | | | |

| Aspheric Surfaces: S2, S4, S5, S7 | | | | |
|---|---|---|---|---|
|  | S2 | S4 | S5 | S7 |
| D | $.114 \times 10^{-6}$ | $.380 \times 10^{-6}$ | $-.600 \times 10^{-9}$ | $-.427 \times 10^{-5}$ |
| E | $-.197 \times 10^{-10}$ | $.121 \times 10^{-9}$ | $-.192 \times 10^{-10}$ | $.214 \times 10^{-8}$ |
| F | $.496 \times 10^{-14}$ | $-.212 \times 10^{-13}$ | $.122 \times 10^{-13}$ | $-.457 \times 10^{-12}$ |
| G | $-.421 \times 10^{-18}$ | $.273 \times 10^{-17}$ | $-.587 \times 10^{-17}$ | $.609 \times 10^{-17}$ |
| K | 1.326 | −.010 | −.010 | −.010 |

EFL = 102.8 mm
Relative Aperture = 1.0

TABLE V

| LENS | SURFACE | RADIUS (mm) | AXIAL DISTANCE BETWEEN SURFACES (mm) | $N_d$ |
|---|---|---|---|---|
| L1 | S1 | 387.282 | | |
|  |  |  | 9.105 | 1.491 57.2 |
|  | S2 | 3076.051 | | |
|  |  |  | 122.000 | |
| L2 | S3 | 63.686 | | |
|  |  |  | 22.346 | 1.491 57.2 |
|  | S4 | 308.432 | | |
|  |  |  | 3.702 | |
| L3 | S5 | 117.490 | | |
|  |  |  | 13.067 | 1.491 57.2 |
|  | S6 | −421.744 | | |
|  |  |  | 56.049 | |
| L4 | S7 | −45.332 | | |
|  |  |  | 2.000 | 1.491 57.2 |
|  | S8 | −725.992 | | |

| Aspheric Surfaces: S2, S3, S6, S7, S8 | | | | | |
|---|---|---|---|---|---|
|  | S2 | S3 | S6 | S7 | S8 |
| D | $.131 \times 10^{-6}$ | $-.861 \times 10^{-7}$ | $.401 \times 10^{-6}$ | $-.362 \times 10^{-5}$ | $-.535 \times 10^{-6}$ |
| E | $-.147 \times$ | $-.341 \times$ | $.931 \times$ | $.301 \times$ | $.669 \times$ |

TABLE V-continued

| | | | | |
|---|---|---|---|---|
| F | $.360 \times 10^{-10}$ | $.693 \times 10^{-10}$ | $-.568 \times 10^{-10}$ | $-.123 \times 10^{-8}$ | $-.222 \times 10^{-9}$ |
| | $10^{-14}$ | $10^{-14}$ | $10^{-13}$ | $10^{-11}$ | $10^{-12}$ |
| G | $-.149 \times 10^{-18}$ | $-.418 \times 10^{-17}$ | $.120 \times 10^{-16}$ | $.102 \times 10^{-15}$ | $.359 \times 10^{-16}$ |
| K | 1.326 | .010 | .010 | .010 | .010 |

EFL = 102.6 mm
Relative Aperture = 1/1.13

TABLE VI

| LENS | SURFACE | RADIUS (mm) | AXIAL DISTANCE BETWEEN SURFACES (mm) | $N_d$ | $V_d$ |
|---|---|---|---|---|---|
| L1 | S1 | Plano | | | |
| | | | 9.10 | 1.491 | 57.2 |
| | S2 | −687.87 | | | |
| | | | 122.00 | | |
| L2 | S3 | 70.34 | | | |
| | | | 26.04 | 1.491 | 57.2 |
| | S4 | 168.61 | | | |
| | | | .95 | | |
| L3 | S5 | 117.35 | | | |
| | | | 18.00 | 1.491 | 57.2 |
| | S6 | −238.27 | | | |
| | | | 34.45 | | |
| L4 | S7 | 1954.87 | | | |
| | | | 3.00 | 1.491 | 57.2 |
| | S8 | −1213.46 | | | |
| | | | 32.17 | | |
| L5 | S9 | −53.86 | | | |
| | | | 2.00 | 1.491 | 57.2 |
| | S10 | Plano | | | |

Aspheric Surfaces: S2, S4, S5, S8, S9

| | S2 | S4 | S5 | S8 | S9 |
|---|---|---|---|---|---|
| D | $.155 \times 10^{-6}$ | $.392 \times 10^{-6}$ | $.119 \times 10^{-7}$ | $.856 \times 10^{-7}$ | $-.366 \times 10^{-5}$ |
| E | $-.198 \times 10^{-10}$ | $.116 \times 10^{-9}$ | $-.121 \times 10^{-10}$ | $.670 \times 10^{-10}$ | $.194 \times 10^{-8}$ |
| F | $.473 \times 10^{-14}$ | $-.158 \times 10^{-13}$ | $.121 \times 10^{-13}$ | $-.215 \times 10^{-13}$ | $-.576 \times 10^{-12}$ |
| G | $-.378 \times 10^{-18}$ | $.570 \times 10^{-17}$ | $-.219 \times 10^{-17}$ | $-.959 \times 10^{-17}$ | $.335 \times 10^{-17}$ |
| K | 1.326 | 0.010 | .010 | .001 | .010 |

EFL = 104.9 mm
Relative Aperture = 1.0

TABLE VII

| LENS | SURFACE | RADIUS (mm) | AXIAL DISTANCE BETWEEN SURFACES (mm) | $N_d$ | $V_d$ |
|---|---|---|---|---|---|
| L1 | S1 | 175.713 | | | |
| | | | 13.000 | 1.491 | 57.2 |
| | S1 | 464.585 | | | |
| | | | 79.614 | | |
| L2 | S3 | 85.923 | | | |
| | | | 28.950 | 1.491 | 57.2 |
| | S4 | −4411.900 | | | |
| | | | 39.721 | | |
| L3 | S5 | 78.041 | | | |
| | | | 9.788 | 1.5161 | 80.0 |
| | S6 | 159.040 | | | |
| | | | 6.408 | | |
| L4 | S7 | Plano | | | |
| | | | 5.000 | 1.491 | 57.2 |
| | S8 | 1352.187 | | | |
| | | | 27.319 | | |
| L5 | S9 | −50.861 | | | |
| | | | 3.000 | 1.491 | 57.2 |
| | S10 | Plano | | | |

Aspheric Surfaces: S1, S4, S8, S9

| | S1 | S4 | S8 | S9 |
|---|---|---|---|---|
| D | $-.748 \times 10^{-7}$ | $-.930 \times 10^{-7}$ | $.722 \times 10^{-6}$ | $.977 \times 10^{-6}$ |
| E | $-.412 \times 10^{-11}$ | $.194 \times 10^{-10}$ | $-.245 \times 10^{-9}$ | $-.423 \times 10^{-9}$ |
| F | $-.556 \times 10^{-15}$ | $-.157 \times 10^{-14}$ | $.176 \times 10^{-12}$ | $.182 \times 10^{-12}$ |
| G | $.291 \times 10^{-19}$ | $.108 \times 10^{-18}$ | $-.559 \times 10^{-16}$ | $.300 \times 10^{-16}$ |

TABLE VII-continued

| | | | |
|---|---|---|---|
| K | .010 | .010 | .010 | .010 |

EFL = 133.2 mm
Relative Aperture = 1/1.0

The lens of Table VII differs from FIG. 3 in that element L2 is biconvex, having a surface L4 of large negative radius, and element L3 is a positive meniscus concave to the object.

TABLE VIII

| LENS | SURFACE | RADIUS (mm) | AXIAL DISTANCE BETWEEN SURFACES (mm) | $N_d$ | $V_d$ |
|---|---|---|---|---|---|
| L1 | S1 | 283.220 | | | |
| | | | 9.104 | 1.491 | 57.2 |
| | S2 | 665.151 | | | |
| | | | 122.000 | | |
| L2 | S3 | 64.748 | | | |
| | | | 16.052 | 1.491 | 57.2 |
| | S4 | 167.811 | | | |
| | | | 6.168 | | |
| L3 | S5 | 93.902 | | | |
| | | | 19.654 | 1.516 | 80.0 |
| | S6 | −339.234 | | | |
| | | | 24.306 | | |
| L4 | S7 | Plano | | | |
| | | | 5.000 | 1.491 | 57.2 |
| | S8 | 4920.555 | | | |
| | | | 27.314 | | |
| L5 | S9 | −46.061 | | | |
| | | | 2.000 | 1.491 | 57.2 |
| | S10 | Plano | | | |

Aspheric Surfaces: S2, S4, S8, S9

| | S2 | S4 | S8 | S9 |
|---|---|---|---|---|
| D | $.967 \times 10^{-7}$ | $.286 \times 10^{-6}$ | $.660 \times 10^{-6}$ | $-.894 \times 10^{-6}$ |
| E | $-.372 \times 10^{-12}$ | $.114 \times 10^{-9}$ | $.164 \times 10^{-9}$ | $-.903 \times 10^{-9}$ |
| F | $.435 \times 10^{-15}$ | $-.241 \times 10^{-13}$ | $-.332 \times 10^{-13}$ | $.201 \times 10^{-11}$ |
| G | $.875 \times 10^{-19}$ | $.675 \times 10^{-17}$ | $.327 \times 10^{-16}$ | $-.116 \times 10^{-14}$ |
| K | 1.326 | .010 | .010 | .010 |

EFL = 102.4 mm
Relative Aperture = 1/1.13

TABLE IX

| LENS | SURFACE | RADIUS (mm) | AXIAL DISTANCE BETWEEN SURFACES (mm) | $N_d$ | $V_d$ |
|---|---|---|---|---|---|
| L1 | S1 | 219.098 | | | |
| | | | 9.104 | 1.491 | 57.2 |
| | S2 | 373.597 | | | |
| | | | 122.000 | | |
| L2 | S3 | 67.227 | | | |
| | | | 16.052 | 1.491 | 57.2 |
| | S4 | 178.945 | | | |
| | | | 5.068 | | |
| L3 | S5 | 93.902 | | | |
| | | | 19.654 | 1.516 | 80.0 |
| | S6 | −339.234 | | | |
| | | | 28.029 | | |
| L4 | S7 | Plano | | | |
| | | | 5.000 | 1.491 | 57.2 |
| | S8 | 819.971 | | | |
| | | | 27.411 | | |
| L5 | S9 | −49.111 | | | |
| | | | 2.000 | 1.491 | 57.2 |
| | S10 | Plano | | | |

Aspheric Surfaces: S2, S4, S8, S9

| | S2 | S4 | S8 | S9 |
|---|---|---|---|---|
| D | $.817 \times 10^{-7}$ | $.331 \times 10^{-6}$ | $.607 \times 10^{-6}$ | $-.128 \times 10^{-5}$ |
| E | $.251 \times 10^{-11}$ | $.571 \times 10^{-10}$ | $.632 \times 10^{-9}$ | $-.912 \times 10^{-10}$ |
| F | $.466 \times 10^{-15}$ | $-.496 \times 10^{-14}$ | $-.541 \times 10^{-12}$ | $.906 \times 10^{-12}$ |
| G | $.312 \times 10^{-20}$ | $.320 \times 10^{-17}$ | $.270 \times 10^{-15}$ | $-.690 \times 10^{-15}$ |

TABLE IX-continued

| | | | | |
|---|---|---|---|---|
| K | 1.326 | .010 | .010 | .010 |

EFL = 102.3 mm
Relative Aperture = 1/1.13

TABLE X

| LENS | | SURFACE RADIUS (mm) | AXIAL DISTANCE BETWEEN SURFACES (mm) | $N_d$ | $V_d$ |
|---|---|---|---|---|---|
| L1 | S1 | 295.368 | | | |
| | | | 9.104 | 1.491 | 57.2 |
| | S2 | 774.508 | | | |
| | | | 122.000 | | |
| L2 | S3 | 66.132 | | | |
| | | | 20.712 | 1.491 | 57.2 |
| | S4 | 303.415 | | | |
| | | | 5.397 | | |
| L3 | S5 | 114.519 | | | |
| | | | 12.406 | 1.491 | 57.2 |
| | S6 | −781.546 | | | |
| | | | 29.954 | | |
| L4 | S7 | Plano | | | |
| | | | 5.000 | 1.491 | 57.2 |
| | S8 | −609.533 | | | |
| | | | 29.426 | | |
| L5 | S9 | −47.954 | | | |
| | | | 2.000 | 1.491 | 57.2 |
| | S10 | Plano | | | |

Aspheric Surfaces: S2,S3,S6,S8,S9

| | S2 | S3 | S6 |
|---|---|---|---|
| D | $.104 \times 10^{-6}$ | $-.115 \times 10^{-6}$ | $.223 \times 10^{-6}$ |
| E | $-.150 \times 10^{-10}$ | $-.312 \times 10^{-10}$ | $.948 \times 10^{-10}$ |
| F | $.375 \times 10^{-14}$ | $.457 \times 10^{-14}$ | $-.475 \times 10^{-13}$ |
| G | $-.264 \times 10^{-18}$ | $-.311 \times 10^{-17}$ | $.894 \times 10^{-17}$ |
| K | 1.326 | .010 | .010 |

| | S8 | S9 |
|---|---|---|
| D | $.276 \times 10^{-6}$ | $-.349 \times 10^{-5}$ |
| E | $.218 \times 10^{-9}$ | $.329 \times 10^{-8}$ |
| F | $-.119 \times 10^{-12}$ | $-.141 \times 10^{-11}$ |
| K | .010 | .010 |

EFL = 102.36 mm
Relative Aperture = 1/1.13

TABLE XI

| LENS | | SURFACE RADIUS (mm) | AXIAL DISTANCE BETWEEN SURFACES (mm) | $N_d$ | $V_d$ |
|---|---|---|---|---|---|
| L1 | S1 | 319.058 | | | |
| | | | 9.104 | 1.491 | 57.2 |
| | S2 | 1175.302 | | | |
| | | | 122.000 | | |
| L2 | S3 | 63.931 | | | |
| | | | 20.712 | 1.491 | 57.2 |
| | S4 | 257.432 | | | |
| | | | .200 | | |
| L3 | S5 | 114.519 | | | |
| | | | 12.406 | 1.491 | 57.2 |
| | S6 | −781.546 | | | |
| | | | 27.255 | | |
| L4 | S7 | Plano | | | |
| | | | 5.000 | 1.491 | 57.2 |
| | S8 | −609.533 | | | |
| | | | 29.426 | | |
| L5 | S9 | −49.370 | | | |
| | | | 2.000 | 1.491 | 57.2 |
| | S10 | Plano | | | |

Aspheric Surfaces: S2,S3,S6,S8,S9

| | S2 | S3 | S6 |
|---|---|---|---|
| D | $.104 \times 10^{-6}$ | $-.908 \times 10^{-7}$ | $.223 \times 10^{-6}$ |
| E | $-.125 \times 10^{-10}$ | $-.305 \times 10^{-10}$ | $.948 \times 10^{-10}$ |
| F | $.398 \times 10^{-14}$ | $.392 \times 10^{-14}$ | $0.475 \times 10^{-13}$ |
| G | $-.354 \times 10^{-18}$ | $-.310 \times 10^{-17}$ | $.894 \times 10^{-17}$ |
| K | 1.326 | .010 | .010 |

| | S8 | S9 |
|---|---|---|
| D | $.296 \times 10^{-6}$ | $-.354 \times 10^{-5}$ |
| E | $.218 \times 10^{-9}$ | $.281 \times 10^{-8}$ |
| F | $-.119 \times 10^{-12}$ | $-.167 \times 10^{-11}$ |
| G | $.146 \times 10^{-16}$ | $.407 \times 10^{-16}$ |

EFL = 104.3 mm
Relative Aperture = 1/1.10

TABLE XII

| LENS | | SURFACE RADIUS (mm) | AXIAL DISTANCE BETWEEN SURFACES (mm) | $N_d$ | $V_d$ |
|---|---|---|---|---|---|
| L1 | S1 | −892.38 | | | |
| | | | 8.29 | 1.491 | 57.2 |
| | S2 | 5973.19 | | | |
| | | | 33.88 | | |
| L2 | S3 | 53.56 | | | |
| | | | 20.31 | 1.491 | 57.2 |
| | S4 | 2636.84 | | | |
| | | | 7.86 | | |
| L3 | S5 | 102.02 | | | |
| | | | 13.71 | 1.491 | 57.2 |
| | S6 | −143.94 | | | |
| | | | 39.81 | | |
| L4 | S7 | −37.78 | | | |
| | | | 2.00 | 1.491 | 57.2 |
| | S8 | Plano | | | |

Aspheric Surfaces: S1,S4,S5,S6,S7

| | S1 | S4 | S5 |
|---|---|---|---|
| D | $-.726 \times 10^{-6}$ | $.626 \times 10^{-6}$ | $-.727 \times 10^{-7}$ |
| E | $.109 \times 10^{-9}$ | $.123 \times 10^{-9}$ | $-.993 \times 10^{-11}$ |
| F | $-.508 \times 10^{-13}$ | $.109 \times 10^{-12}$ | $-.804 \times 10^{-14}$ |
| G | $.631 \times 10^{-17}$ | $-.613 \times 10^{-16}$ | $-.241 \times 10^{-17}$ |
| K | .010 | .010 | .010 |

| | S6 | S7 |
|---|---|---|
| D | $.117 \times 10^{-6}$ | $-.642 \times 10^{-5}$ |
| E | $.575 \times 10^{-9}$ | $.326 \times 10^{-8}$ |
| F | $-.476 \times 10^{-12}$ | $-.202 \times 10^{-11}$ |
| G | $.196 \times 10^{-15}$ | $.839 \times 10^{-15}$ |
| K | .010 | .010 |

EFL = 73.4
Relative Aperture = 1.0

TABLE XIII

| LENS | | SURFACE RADIUS (mm) | AXIAL DISTANCE BETWEEN SURFACES (mm) | $N_d$ | $V_d$ |
|---|---|---|---|---|---|
| L1 | S1 | −7586.21 | | | |
| | | | 8.29 | 1.491 | 57.2 |
| | S2 | −2224.25 | | | |
| | | | 39.77 | | |
| L2 | S3 | 52.95 | | | |
| | | | 20.31 | 1.491 | 57.2 |
| | S4 | 406.70 | | | |
| | | | 6.66 | | |
| L3 | S5 | 406.70 | | | |
| | | | 11.56 | 1.491 | 57.2 |
| | S6 | −134.37 | | | |
| | | | 41.20 | | |
| L4 | S7 | −39.92 | | | |
| | | | 2.00 | 1.491 | 57.2 |
| | S8 | Plano | | | |

Aspheric Surfaces: S2,S4,S6,S7

| | S2 | S4 | S6 | S7 |
|---|---|---|---|---|
| D | $.714 \times 10^{-6}$ | $.439 \times 10^{-6}$ | $.408 \times 10^{-6}$ | $-.851 \times 10^{-5}$ |
| E | $-.121 \times 10^{-9}$ | $.116 \times 10^{-9}$ | $.602 \times 10^{-9}$ | $.445 \times 10^{-8}$ |
| F | $.815 \times 10^{-13}$ | $.725 \times 10^{-13}$ | $-.477 \times 10^{-12}$ | $-.215 \times 10^{-11}$ |
| G | $-.343 \times 10^{-17}$ | $-.571 \times 10^{-16}$ | $.190 \times 10^{-15}$ | $-.446 \times 10^{-15}$ |

TABLE XIII-continued

| K | 1.326 | .010 | .010 | .010 |
|---|---|---|---|---|

EFL = 73.85
Relative Aperture = 1.0

TABLE XIV

| LENS | SURFACE RADIUS (mm) | AXIAL DISTANCE BETWEEN SURFACES (mm) | $N_d$ | $V_d$ |
|---|---|---|---|---|
| S1 | 95.282 | | | |
| L1 | | 11.210 | 1.491 | 57.2 |
| S2 | 149.554 | | | |
| | | 46.218 | | |
| S3 | 53.438 | | | |
| L2 | | 24.381 | 1.491 | 57.2 |
| S4 | 559.853 | | | |
| | | 19.273 | | |
| S5 | 339.239 | | | |
| L3 | | 9.087 | 1.658 | 44.0 |
| S6 | −124.636 | | | |
| | | 29.819 | | |
| S7 | −38.499 | | | |
| L4 | | 2.000 | 1.491 | 57.2 |
| S8 | Plano | | | |

Aspheric Surfaces: S1,S4,S7

| | S1 | S4 | S7 |
|---|---|---|---|
| D | $-.190 \times 10^{-6}$ | $.986 \times 10^{-6}$ | $-.219 \times 10^{-5}$ |
| E | $.197 \times 10^{-10}$ | $.414 \times 10^{-9}$ | $.554 \times 10^{-8}$ |
| F | $-.232 \times 10^{-13}$ | $-.206 \times 10^{-12}$ | $-.563 \times 10^{-11}$ |
| G | $.381 \times 10^{-17}$ | $.929 \times 10^{-16}$ | $.221 \times 10^{-14}$ |
| K | .010 | .010 | .010 |

EFL = 85.0 mm
Relative Aperture = 1/1.10

TABLE XV

| LENS | SURFACE RADIUS (mm) | AXIAL DISTANCE BETWEEN SURFACES (mm) | $N_d$ | $V_d$ |
|---|---|---|---|---|
| S1 | 108.183 | | | |
| L1 | | 7.287 | 1.491 | 57.2 |
| S2 | 336.795 | | | |
| | | 62.000 | | |
| S3 | 39.019 | | | |
| L2 | | 9.631 | 1.491 | 57.2 |
| S4 | 87.600 | | | |
| | | 1.379 | | |
| S5 | 82.010 | | | |
| L3 | | 10.327 | 1.491 | 57.2 |
| S6 | −89.817 | | | |
| | | 39.714 | | |
| S7 | −27.170 | | | |
| L4 | | 2.000 | 1.491 | 57.2 |
| S8 | 410.441 | | | |

Aspheric Surfaces: S2,S4,S6,S7,S8

| | S2 | S4 | S6 |
|---|---|---|---|
| D | $.805 \times 10^{-6}$ | $.202 \times 10^{-5}$ | $.558 \times 10^{-6}$ |
| E | $-.155 \times 10^{-9}$ | $.152 \times 10^{-8}$ | $.203 \times 10^{-11}$ |
| F | $.212 \times 10^{-12}$ | $-.920 \times 10^{-12}$ | $-.237 \times 10^{-12}$ |
| G | $-.148 \times 10^{-16}$ | $.104 \times 10^{-14}$ | $.167 \times 10^{-16}$ |
| K | 1.326 | .010 | −.010 |

| | S7 | S8 |
|---|---|---|
| D | $-.191 \times 10^{-4}$ | $-.117 \times 10^{-4}$ |
| E | $.369 \times 10^{-7}$ | $.176 \times 10^{-7}$ |
| F | $-.174 \times 10^{-10}$ | $-.118 \times 10^{-10}$ |
| G | $-.976 \times 10^{-14}$ | $.282 \times 10^{-14}$ |
| K | .010 | .010 |

EFL = 56.50 mm
Relative Aperture = 1/1.40

TABLE XVI sets forth the optical powers of the lens units G1, G2 and G3 as $K_{G1}$, $K_{G2}$ and $K_{G3}$, respectively, as the reciprocal of the EFL's of the lens units in millimeters.

TABLE XVI

| TABLE | $K_{G1}$ | $K_{G2}$ | $K_{G3}$ | $K_O$ |
|---|---|---|---|---|
| I | .0008 | .0105 | −.0095 | .0099 |
| II | .0011 | .0102 | −.0076 | .0096 |
| III | .0012 | .0109 | −.0099 | .0097 |
| IV | .0010 | .0104 | −.0096 | .0097 |
| V | .0011 | .0108 | −.0102 | .0098 |
| VI | .0007 | .0099 | −.0092 | .0095 |
| VII | .0018 | .0083 | −.0102 | .0075 |
| VIII | .0010 | .0110 | −.0108 | .0098 |
| IX | .0009 | .0109 | −.0108 | .0098 |
| X | .0010 | .0116 | −.0093 | .0098 |
| XI | .0011 | .0104 | −.0089 | .0096 |
| XII | −.0006 | .0153 | −.963 | .0136 |
| XIII | .0002 | .0148 | −.919 | .0135 |
| XIV | .0020 | .0132 | −.0128 | .0118 |
| XV | .0631 | .0174 | −.0194 | .0177 |

TABLE XVII sets forth the ratio of the powers $K_{G1}$, $K_{G2}$, and $K_{G3}$ of lens units G1, G2, and G3, respectively, to the power $K_o$ of the overall lens and also the ratio of the curvatures of the facing surfaces of elements L2 and L3 of lens unit G2 at the optical axis.

TABLE XVII

| TABLE | $K_{G1}/K_0$ | $K_{G2}/K_0$ | $K_{G3}/K_0$ | $C_4/C_5$ |
|---|---|---|---|---|
| I | .081 | 1.060 | −.960 | .501 |
| II | .115 | 1.063 | −.792 | .308 |
| III | .121 | 1.124 | −1.021 | .381 |
| IV | .103 | 1.072 | −.989 | .046 |
| V | .112 | 1.102 | −1.041 | .380 |
| VI | .074 | 1.042 | −.968 | .696 |
| VII | .240 | 1.107 | −1.360 | −.018 |
| VIII | .102 | 1.122 | −1.102 | .560 |
| IX | .092 | 1.112 | −1.102 | .525 |
| X | .102 | 1.184 | −.949 | .377 |
| XI | .114 | 1.083 | −.927 | .444 |
| XII | −.044 | 1.133 | −.963 | .039 |
| XIII | .002 | 1.096 | −.919 | .257 |
| XIV | .169 | 1.119 | −1.085 | .605 |
| XV | .175 | .983 | −1.096 | .936 |

TABLE XVIII sets forth the ratio of the optical powers $K_2/K_3$ of the elements L2 and L3 of lens unit G2, and the powers of the corrector element L4 of Tables VI-XI, as applicable.

TABLE XVIII

| TABLE | $K_2/K_3$ | K OF DISTORTION CORRECTOR |
|---|---|---|
| III | 1.189 | — |
| IV | .960 | — |
| V | 1.189 | — |
| VI | .710 | .0007 |
| VII | 1.657 | −.0004 |
| VIII | .710 | −.0001 |
| IX | .696 | −.0006 |
| X | 1.224 | .0008 |
| XI | 1.224 | .0008 |
| XII | 1.123 | — |
| XIII | 1.000 | — |
| XIV | 1.179 | — |
| XV | .661 | — |

TABLE XIX sets forth the ranges of the powers of the lens lens unit in relation to the overall power $K_0$ of the lens.

TABLE XIX $.3 > K_{G1}/K_0 > -.05$
$1.4 > K_{G2}/K_0 > 0.8$
$1.4 > |K_{G3}/K_0| > .70$

Where the distortion corrector element L4 of FIG. 3 is utilized, it has an absolute optical power which is always equal to or less than the absolute optical power of the first lens unit which in all cases comprises the element L1. Otherwise stated $$/K_C/ \leq /K_1/$$

The corrector element is spaced at least 0.2 of the equivalent focal length of the lens from the second lens unit as shown in Tables VI-XI.

The ratio of the curvature of the facing surfaces of the elements forming lens unit G2 (L3 and L4) expressed as the reciprocal of the radii at the optical axis is $$1.0 < |C_4/C_5| > 0.03$$

Table XX sets forth the relation of the air spacing ($D_{12}$) between the first and second groups of the lens of Tables I-XV in relation to the equivalent focal length of each of the lens of Tables I-XV.

TABLE XX

| Table | $D_{12}$ (mm) | EFL (mm) | D/EFL |
|---|---|---|---|
| I | 122.00 | 101.1 | 1.21 |
| II | 122.00 | 104.3 | 1.17 |
| III | 122.00 | 102.8 | 1.19 |
| IV | 122.00 | 102.8 | 1.19 |
| V | 122.00 | 102.6 | 1.19 |
| VI | 122.00 | 104.9 | 1.16 |
| VII | 79.61 | 133.2 | .60 |
| VIII | 122.00 | 102.4 | 1.19 |
| IX | 122.00 | 102.3 | 1.19 |
| X | 122.00 | 102.4 | 1.19 |
| XI | 122.00 | 104.3 | 1.17 |
| XII | 33.88 | 73.4 | .46 |
| XIII | 39.77 | 73.9 | .54 |
| XIV | 46.22 | 85.0 | .54 |
| XV | 62.00 | 56.5 | 1.10 |

It may thus be seen that the objects of the invention set forth as well as those made apparent from the foregoing description are efficiently attained. While preferred embodiments of the invention have been set forth for purposes of disclosure, modification to the disclosed embodiments of the invention as well as other embodiments thereof may occur to those skilled in the art. Accordingly, the appended claims are intended to cover all embodiments of the invention and modifications to the disclosed embodiments which do not depart from the spirit and scope of the invention.

Having thus described the invention, what is claimed is:

1. A projection lens from the image end consisting of a first lens unit of weak optical power serving to provide correction for aperture dependent aberrations, said first lens unit comprising a single element, a second lens unit having convex image and object surfaces and providing substantially all of the positive power of the overall lens, and a third negative lens unit air spaced from said second lens unit having a strongly concave image side surface and contributing to correction of field curvature; said second lens unit consisting of two elements having facing surfaces defining a meniscus shaped air gap, one of said elements of said second lens unit being biconvex, said first, second, and third groups having optical powers $K_{G1}$, $K_{G2}$, and $K_{G3}$, respectively, the overall lens having an optical power $K_0$, and $$0.3 > G_{G1}/K_0 > -0.05$$

$$1.4 > K_{G2}/K_0 > 0.8$$

$$1.4 > |K_{G3}/K_0| > 0.70$$

2. A lens according to claim 1 where said two elements of said second lens unit from the image end have optical powers $K_2$ and $K_3$, respectively, and $$1.8 > K_2/K_3 > 0.6.$$

3. A lens according to claim 1 where the elements of said second lens unit have facing surfaces $S_4$ and $S_5$ where $S_4$ is the object side surface of the image side element and $S_5$ is the image side surface of the object side element, said surfaces $S_4$ and $S_5$ having curvatures $C_4$ and $C_5$, respectively, at the optical axis and $$1.0 > C_4/C_5 > 0.01$$

where $C_4$ and $C_5$ are the reciprocals of the radii of the surfaces $S_4$ and $S_5$, respectively, at the optical axis of the lens in millimeters.

4. A lens according to claim 1 where a thin lens element having at least one aspheric surface is disposed between said second and third lens unit.

5. The lens of claim 4 where said thin element forms part of said third lens unit.

6. A lens according to claim 5 where said thin element has substantially the same absolute optical power or less as said first lens unit.

7. The lens of claim 1 wherein said lens elements may have aspheric surfaces defined by the equation $$X = \frac{Cy^2}{1 + \sqrt{1 - (1 + K) C^2 y^2}} + Dy^4 + Ey^6 + Fy^8 + Gy^{10}$$

where X is the surface sag at a semi-aperture distance y from the axis of the lens; C is the curvature of the lens surface at the optical axis, equal to the reciprocal of the radius at the optical axis; and K is a conic constant.

8. A lens according to claim 7 scaled for a object having a diagonal of approximately five inches substantially described as follows:

| LENS | SURFACE RADIUS (mm) | AXIAL DISTANCE BETWEEN SURFACES (mm) | $N_d$ | $V_d$ |
|---|---|---|---|---|
| L1 | S1 Plano | | | |
| | | 9.10 | 1.491 | 57.2 |
| | S2 −613.41 | | | |
| | | 122.00 | | |
| L2 | S3 69.79 | | | |
| | | 26.04 | 1.491 | 57.2 |
| | S4 233.67 | | | |
| | | 2.06 | | |
| L3 | S5 117.08 | | | |
| | | 18.00 | 1.491 | 57.2 |
| | S6 −232.10 | | | |
| | | 61.98 | | |
| L4 | S7 −51.79 | | | |
| | | 2.00 | 1.491 | 57.2 |
| | S8 Plano | | | |

| Aspheric Surfaces: S2,S4,S5,S7 | | | |
|---|---|---|---|
| S2 | S4 | S5 | S7 |
| D .125 × $10^{-6}$ | .403 × $10^{-6}$ | −.648 × $10^{-8}$ | −.406 × $10^{-5}$ |
| E −.190 × $10^{-10}$ | .116 × $10^{-9}$ | −.115 × $10^{-10}$ | .210 × $10^{-8}$ |
| F .497 × $10^{-14}$ | −.180 × $10^{-13}$ | .141 × $10^{-13}$ | −.440 × $10^{-12}$ |
| G −.399 × $10^{-18}$ | .595 × $10^{-17}$ | −.249 × $10^{-17}$ | −.106 × $10^{-16}$ |

-continued

| | K | 1.326 | −.010 | .010 | .010 |

EFL = 101.1 mm
Relative Aperture = 1.0 where $N_d$ is the index of refraction of the lens elements, $V_d$ is the dispersion of the lens measured by its Abbe number, S1–S8 are successive lens surfaces, the surfaces where positive are on radii struck from the right and where negative are on radii struck from the left, and surfaces S2, S4, S5 and S7 are aspheric as shown.

9. A lens according to claim 7 scaled for a object having a diagonal of approximately five inches substantially described as follows:

| LENS | | SURFACE RADIUS (mm) | AXIAL DISTANCE BETWEEN SURFACES (mm) | $N_d$ | $V_d$ |
|---|---|---|---|---|---|
| L1 | S1 | 403.31 | | | |
| | | | 9.10 | 1.491 | 57.2 |
| | S2 | 3045.20 | | | |
| | | | 122.00 | | |
| L2 | S3 | 66.90 | | | |
| | | | 22.32 | 1.491 | 57.2 |
| | S4 | 431.31 | | | |
| | | | 10.22 | | |
| L3 | S5 | 132.76 | | | |
| | | | 12.70 | 1.491 | 57.2 |
| | S6 | −469.26 | | | |
| | | | 60.00 | | |
| L4 | S7 | −65.01 | | | |
| | | | 2.00 | 1.491 | 57.2 |
| | S8 | Plano | | | |

| Aspheric Surfaces: S2,S3,S6,S7 | | | | |
|---|---|---|---|---|
| | S2 | S3 | S6 | S7 |
| D | $.100 \times 10^{-6}$ | $-.156 \times 10^{-6}$ | $.282 \times 10^{-6}$ | $-.752 \times 10^{-5}$ |
| E | $-.145 \times 10^{-10}$ | $-.200 \times 10^{-10}$ | $.122 \times 10^{-9}$ | $.480 \times 10^{-8}$ |
| F | $.406 \times 10^{-14}$ | $.327 \times 10^{-14}$ | $-.538 \times 10^{-13}$ | $-.182 \times 10^{-11}$ |
| G | $-.335 \times 10^{-18}$ | $-.258 \times 10^{-17}$ | $.111 \times 10^{-16}$ | $.166 \times 10^{-15}$ |
| K | 1.326 | .010 | .010 | .010 |

EFL = 104.3
Relative Aperture = 1.0 where $N_d$ is the index of refraction of the lens elements, $V_d$ is the dispersion of the lens measured by its Abbe number, S1–S8 are successive lens surfaces, the surfaces where positive and on radii struck from the right and where negative are on radii struck from the left, and surfaces S2, S5, S6 and S7 are aspheric as shown.

10. A lens according to claim 7 scaled for a rectangular object having a diagonal of approximately five inches substantially described as follows:

| LENS | | SURFACE RADIUS (mm) | AXIAL DISTANCE BETWEEN SURFACES (mm) | $N_d$ | $V_d$ |
|---|---|---|---|---|---|
| L1 | S1 | 324.07 | | | |
| | | | 9.10 | 1.491 | 57.2 |
| | S2 | 1415.03 | | | |
| | | | 122.00 | | |
| L2 | S3 | 63.69 | | | |
| | | | 22.35 | 1.491 | 57.2 |
| | S4 | 308.43 | | | |
| | | | 3.83 | | |
| | S5 | 117.49 | | | |
| L3 | | | 13.07 | 1.491 | 57.2 |
| | S6 | −421.74 | | | |
| | | | 55.36 | | |
| | S7 | −49.78 | | | |
| L4 | | | 2.00 | 1.491 | 57.2 |
| | S8 | 52488.91 | | | |

| Aspheric Surfaces: S2,S3,S6,S7,S8 | | |
|---|---|---|
| | S2 | S3 | S6 |
| D | $.131 \times 10^{-6}$ | $-.861 \times 10^{-7}$ | $.401 \times 10^{-6}$ |
| E | $-.150 \times 10^{-10}$ | $-.341 \times 10^{-10}$ | $.931 \times 10^{-10}$ |
| F | $.385 z 10^{-14}$ | $.693 \times 10^{-14}$ | $-.568 \times 10^{-13}$ |
| G | $-.156 \times 10^{-18}$ | $-.418 \times 10^{-17}$ | $.120 \times 10^{-16}$ |
| K | 1.326 | .010 | .010 |

| | S7 | S8 |
|---|---|---|
| D | $-.475 \times 10^{-5}$ | $-.395 \times 10^{-6}$ |
| E | $.332 \times 10^{-8}$ | $.378 \times 10^{-9}$ |
| F | $-.146 \times 10^{-11}$ | $-.128 \times 10^{-12}$ |
| G | $.891 \times 10^{-16}$ | $.272 \times 10^{-16}$ |
| K | .010 | .010 |

EFL = 102.79 mm
Relative Aperture = 1.0 where $N_d$ is the index of refraction of the lens elements, $V_d$ is the dispersion of the lens measured by its Abbe number, S1–S8 are successive lens surfaces, the surfaces where positive are on radii struck from the right and where negative are on radii struck from the left, and surfaces S2, S3, S6, S7 and S8 are aspheric as shown.

11. A lens according to claim 7 scaled for a object having a diagonal of approximately five inches substantially described as follows:

| LENS | | SURFACE RADIUS (mm) | AXIAL DISTANCE BETWEEN SURFACES (mm) | $N_d$ | $V_d$ |
|---|---|---|---|---|---|
| L1 | S1 | Plano | | | |
| | | | 9.10 | 1.491 | 57.2 |
| | S2 | −491.74 | | | |
| | | | 122.00 | | |
| L2 | S3 | 68.16 | | | |
| | | | 26.04 | 1.491 | 57.2 |
| | S4 | 267.01 | | | |
| | | | 5.88 | | |
| L3 | S5 | 126.40 | | | |
| | | | 18.00 | 1.491 | 57.2 |
| | S6 | −242.22 | | | |
| | | | 58.04 | | |
| L4 | S7 | −51.21 | | | |
| | | | 2.00 | 1.491 | 57.2 |
| | S8 | Plano | | | |

| Aspheric Surfaces: S2,S4,S5,S7 | | | |
|---|---|---|---|
| | S2 | S4 | S5 | S7 |
| D | $.114 \times 10^{-6}$ | $.380 \times 10^{-6}$ | $-.600 \times 10^{-9}$ | $-.427 \times 10^{-5}$ |
| E | $-.197 \times 10^{-10}$ | $.121 \times 10^{-9}$ | $-.192 \times 10^{-10}$ | $.214 \times 10^{-8}$ |
| F | $.496 \times 10^{-14}$ | $-.212 \times 10^{-13}$ | $.122 \times 10^{-13}$ | $-.457 \times 10^{-12}$ |
| G | $-.421 \times 10^{-18}$ | $.273 \times 10^{-17}$ | $-.587 \times 10^{-17}$ | $.610 \times 10^{-17}$ |
| K | 1.326 | −.010 | −.010 | −.010 |

EFL = 102.8 mm
Relative Aperture = 1.0 where $N_d$ is the index of refraction of the lens elements, $V_d$ is the dispersion of the lens measured by its Abbe number, S1–S8 are successive lens surfaces, the surfaces where positive are on radii struck from the right and where negativve are on radii struck from the left, and surfaces S2, S4, S5 and S7 are aspheric as shown.

12. A lens according to claim 7 scaled for a object having a diagonal of approximately five inches substantially described as follows:

| LENS | | SURFACE RADIUS (mm) | AXIAL DISTANCE BETWEEN SURFACES (mm) | $N_d$ | $V_d$ |
|---|---|---|---|---|---|
| L1 | S1 | 387.282 | | | |
|    |    |         | 9.105 | 1.491 | 57.2 |
|    | S2 | 3076.051 | | | |
|    |    |         | 122.000 | | |
| L2 | S3 | 63.686 | | | |
|    |    |        | 22.346 | 1.491 | 57.2 |
|    | S4 | 308.432 | | | |
|    |    |         | 3.702 | | |
| L3 | S5 | 117.490 | | | |
|    |    |         | 13.067 | 1.491 | 57.2 |
|    | S6 | −421.744 | | | |
|    |    |          | 56.049 | | |
| L4 | S7 | −45.332 | | | |
|    |    |         | 2.000 | 1.491 | 57.2 |
|    | S8 | −725.992 | | | |

| Aspheric Surfaces: S2,S3,S6,S7,S8 | | | |
|---|---|---|---|
| | S2 | S3 | S6 |
| D | $.131 \times 10^{-6}$ | $-.861 \times 10^{-7}$ | $.401 \times 10^{-6}$ |
| E | $-.147 \times 10^{-10}$ | $-.341 \times 10^{-10}$ | $.931 \times 10^{-10}$ |
| F | $.360 \times 10^{-14}$ | $.693 \times 10^{-14}$ | $-.568 \times 10^{-13}$ |
| G | $-.149 \times 10^{-18}$ | $-.418 \times 10^{-17}$ | $.120 \times 10^{-16}$ |
| K | 1.326 | .010 | .010 |

| | S7 | S8 |
|---|---|---|
| D | $-.362 \cdot 10^{-5}$ | $-.535 \times 10^{-6}$ |
| E | $.301 \times 10^{-8}$ | $.669 \times 10^{-9}$ |
| F | $-.123 \times 10^{-11}$ | $-.222 \times 10^{-12}$ |
| G | $.102 \times 10^{-15}$ | $.359 \times 10^{-16}$ |
| K | .010 | .010 |

EFL = 102.6 mm
Relative Aperture = 1/1.13 where $N_d$ is the index of refraction of the lens elements, $V_d$ is the dispersion of the lens measured by its Abbe number, S1–S8 are successive lens surfaces, the surfaces where positive are on radii struck from the right and where negative are on radii struck from the left, and surfaces S2, S3, S6, S7 and S8 are aspheric as shown.

13. A lens according to claim 7 scaled for a object having a diagonal of approximately five inches substantially described as follows:

| LENS | | SURFACE RADIUS (mm) | AXIAL DISTANCE BETWEEN SURFACES (mm) | $N_d$ | $V_d$ |
|---|---|---|---|---|---|
| L1 | S1 | −892.38 | | | |
|    |    |         | 8.29 | 1.491 | 57.2 |
|    | S2 | 5973.19 | | | |
|    |    |         | 33.88 | | |
| L2 | S3 | 53.56 | | | |
|    |    |       | 20.31 | 1.491 | 57.2 |
|    | S4 | 2636.84 | | | |
|    |    |         | 7.86 | | |
| L3 | S5 | 102.02 | | | |
|    |    |        | 13.71 | 1.491 | 57.2 |
|    | S6 | −143.94 | | | |
|    |    |         | 39.81 | | |
| L4 | S7 | −37.78 | | | |
|    |    |        | 2.00 | 1.491 | 57.2 |
|    | S8 | Plano | | | |

| Aspheric Surfaces: S1,S4,S5,S6,S7 | | | |
|---|---|---|---|
| | S1 | S4 | S5 |
| D | $-.726 \times 10^{-6}$ | $.626 \times 10^{-6}$ | $-.727 \times 10^{-7}$ |
| E | $.109 \times 10^{-9}$ | $.123 \times 10^{-9}$ | $-.993 \times 10^{-11}$ |
| F | $-.508 \times 10^{-13}$ | $.109 \times 10^{-12}$ | $-.804 \times 10^{-14}$ |
| G | $.631 \times 10^{-17}$ | $-.613 \times 10^{-16}$ | $-.241 \times 10^{-17}$ |
| K | .010 | .010 | .010 |

| | S6 | S7 |
|---|---|---|
| D | $.117 \times 10^{-6}$ | $-.642 \times 10^{-5}$ |
| E | $.575 \times 10^{-9}$ | $.326 \times 10^{-8}$ |
| F | $-.476 \times 10^{-12}$ | $-.202 \times 10^{-11}$ |
| G | $.196 \times 10^{-15}$ | $.839 \times 10^{-15}$ |
| K | .010 | .010 |

EFL = 73.4
Relative Aperture = 1.0 where $N_d$ is the index of refraction of the lens elements, $V_d$ is the dispersion of the lens measured by its Abbe number, S1–S8 are successive lens surfaces, the surfaces where positive are on radii struck from the right and where negative are on radii struck from the left, and surfaces S1, S4, S5, S6 and S7 are aspheric as shown.

14. A lens according to claim 7 scaled for a object having a diagonal of approximately five inches substantially described as follows:

| LENS | | SURFACE RADIUS (mm) | AXIAL DISTANCE BETWEEN SURFACES (mm) | $N_d$ | $V_d$ |
|---|---|---|---|---|---|
| L1 | S1 | −7586.21 | | | |
|    |    |          | 8.29 | 1.491 | 57.2 |
|    | S2 | −2224.25 | | | |
|    |    |          | 39.77 | | |
| L2 | S3 | 52.95 | | | |
|    |    |       | 20.31 | 1.491 | 57.2 |
|    | S4 | 406.70 | | | |
|    |    |        | 6.66 | | |
| L3 | S5 | 104.32 | | | |
|    |    |        | 11.56 | 1.491 | 57.2 |
|    | S6 | −134.37 | | | |
|    |    |         | 41.20 | | |
| L4 | S7 | −39.92 | | | |
|    |    |        | 2.00 | 1.491 | 57.2 |
|    | S8 | Plano | | | |

| Aspheric Surfaces: S2,S4,S6,S7 | | | | |
|---|---|---|---|---|
| | S2 | S4 | S6 | S7 |
| D | $.714 \times 10^{-6}$ | $.439 \times 10^{-6}$ | $.408 \times 10^{-6}$ | $-.851 \times 10^{-5}$ |
| E | $-.121 \times 10^{-9}$ | $.116 \times 10^{-9}$ | $.602 \times 10^{-9}$ | $.445 \times 10^{-8}$ |
| F | $.815 \times 10^{-13}$ | $.725 \times 10^{-13}$ | $-.477 \times 10^{-12}$ | $-.215 \times 10^{-11}$ |
| G | $-.343 \times 10^{-17}$ | $-.571 \times 10^{-16}$ | $.190 \times 10^{-15}$ | $-.446 \times 10^{-15}$ |
| K | 1.326 | .010 | .010 | .010 |

EFL = 73.85
Relative Aperture = 1.0 where $N_d$ is the index of refraction of the lens elements, $V_d$ is the dispersion of the lens measured by its Abbe number, S1–S8 are successive lens surfaces, the surfaces where positive are on radii struck from the right and where negative are on radii struck from the left, and surfaces S2, S4, S6 and S7 are aspheric as shown.

15. A lens according to claim 7 scaled for a object having a diagonal of approximately five inches substantially described as follows:

| SURFACE | AXIAL DISTANCE BETWEEN SURFACES |
|---|---|

-continued

| LENS | | RADIUS (mm) | (mm) | $N_d$ | $V_d$ |
|---|---|---|---|---|---|
| L1 | S1 | 95.282 | | | |
| | | | 11.210 | 1.491 | 57.2 |
| | S2 | 149.554 | | | |
| | | | 46.218 | | |
| L2 | S3 | 53.438 | | | |
| | | | 24.381 | 1.491 | 57.2 |
| | S4 | 559.853 | | | |
| | | | 19.273 | | |
| L3 | S5 | 339.239 | | | |
| | | | 9.087 | 1.658 | 44.0 |
| | S6 | −124.636 | | | |
| | | | 29.819 | | |
| L4 | S7 | −38.499 | | | |
| | | | 2.000 | 1.491 | 57.2 |
| | S8 | Plano | | | |

| | S1 | S4 | S7 |
|---|---|---|---|
| D | $-.190 \times 10^{-6}$ | $.986 \times 10^{-6}$ | $-.219 \times 10^{-5}$ |
| E | $.197 \times 10^{-10}$ | $.414 \times 10^{-9}$ | $.554 \times 10^{-8}$ |
| F | $-.232 \times 10^{-13}$ | $-.206 \times 10^{-12}$ | $-.563 \times 10^{-11}$ |
| G | $.381 \times 10^{-17}$ | $.929 \times 10^{-16}$ | $.221 \times 10^{-14}$ |
| K | .010 | .010 | .010 | where $N_d$ is the index of refraction of the lens elements, $V_d$ is the dispersion of the lens measured by its Abbe number, S1–S8 are successive lens surfaces, the surfaces where positive are on radii struck from the right and where negative are on radii struck from the left, and surfaces S1, S4 and S7 are aspheric as shown.

16. A lens according to claim 7 scaled for a object having a diagonal of approximately five inches substantially described as follows:

| LENS | | SURFACE RADIUS (mm) | AXIAL DISTANCE BETWEEN SURFACES (mm) | $N_d$ | $V_d$ |
|---|---|---|---|---|---|
| L1 | S1 | 108.183 | | | |
| | | | 7.287 | 1.491 | 57.2 |
| | S2 | 336.795 | | | |
| | | | 62.000 | | |
| L2 | S3 | 39.019 | | | |
| | | | 9.631 | 1.491 | 57.2 |
| | S4 | 87.600 | | | |
| | | | 1.379 | | |
| L3 | S5 | 82.010 | | | |
| | | | 10.327 | 1.491 | 57.2 |
| | S6 | −89.817 | | | |
| | | | 39.714 | | |
| L4 | S7 | −27.170 | | | |
| | | | 2.000 | 1.491 | 57.2 |
| | S8 | 410.441 | | | |

| | S2 | S4 | S6 |
|---|---|---|---|
| D | $.805 \times 10^{-6}$ | $.202 \times 10^{-5}$ | $.558 \times 10^{-6}$ |
| E | $-.155 \times 10^{-9}$ | $.152 \times 10^{-8}$ | $.203 \times 10^{-11}$ |
| F | $.212 \times 10^{-12}$ | $-.920 \times 10^{-12}$ | $-.237 \times 10^{-12}$ |
| G | $-.148 \times 10^{-16}$ | $.104 \times 10^{-14}$ | $.167 \times 10^{-16}$ |
| K | 1.326 | .010 | −.010 |

| | S7 | S8 |
|---|---|---|
| D | $-.191 \times 10^{-4}$ | $-.117 \times 10^{-4}$ |
| E | $.369 \times 10^{-7}$ | $.176 \times 10^{-7}$ |
| F | $-.174 \times 10^{-10}$ | $-.118 \times 10^{-10}$ |
| K | .010 | .010 |

EFL = 56.5 mm
Relative Aperture = 1/1.4 where $N_d$ is the index of refraction of the lens elements, $V_d$ is the dispersion of the lens measured by its Abbe number, S1–S8 are successive lens surfaces, the surfaces where positive are on radii struck from the right and where negative are on radii struck from the left, and surfaces S2, S4, S6, S7 and S8 are aspheric as shown.

17. A projection lens from the image end consisting of a first lens unit of weak optical power serving to provide correction for aperture dependent aberrations, a second biconvex lens unit air spaced from said first lens unit providing substantially all of the positive power of the overall lens, and a third negative lens unit air spaced from said second lens unit, said third negative lens unit consisting of an element having a concave image side surface and serving as a field flattener and providing correction for field curvature, and an additional element on the image side of said third lens unit, said additional element having at least one aspheric surface and serving to contribute to correction of distortion, said additional element having an absolute optical power equal to or less than the absolute optical power of said first lens unit.

18. The lens of claim 17 where said second lens unit consists of two elements of overall biconvex form, at least one of the facing surfaces of the elements of said second group being aspheric.

19. The lens of claim 18 where said two elements of said second lens unit from the image end have optical powers $K_2$ and $K_3$, respectively, and $$1.8 > K_2/K_3 > 0.6.$$

20. A lens according to claim 17 where the elements of said second lens unit have facing surfaces $S_4$ and $S_5$ where $S_4$ is the object side surface of the image side element and $S_5$ is the image side surface of the object side element, said surfaces $S_4$ and $S_5$ having curvatures $C_4$ and $C_5$, respectively, where said curvatures are the reciprocal of the radii of said surfaces at the optical axis in millimeters, and $$1.0 > C_4/C_5 > 0.01.$$

21. A lens according to claim 17 where $$0.3 > K_{G1}/K_0 > 0.06$$

$$1.2 > K_{G2}/K_0 > 1.0$$

$$1.4 > |K_{G3}/K_0| > 0.9$$

where $K_{G1}$, $K_{G2}$, and $K_{G3}$ are the axial optical powers of said first, second and third lens units, respectively, and $K_0$ is the optical power of the overall lens.

22. The lens of claim 17 wherein said lens elements may have aspheric surfaces defined by the equation $$X = \frac{Cy^2}{1 + \sqrt{1 - (1 + K) C^2 y^2}} + Dy^4 + Ey^6 + Fy^8 + Gy^{10}$$

where X is the surface sag at a semi-aperture distance Y from the axis of the lens; C is the curvature of the lens surface at the optical axis, equal to the reciprocal of the radius at the optical axis; and K is a conic constant.

23. A lens according to claim 22 defined substantially as follows:

| LENS | | SURFACE RADIUS (mm) | AXIAL DISTANCE BETWEEN SURFACES (mm) | $N_d$ | $V_d$ |
|---|---|---|---|---|---|
| L1 | S1 | Plano | | | |
| | | | 9.10 | 1.491 | 57.2 |

-continued

| | | | | |
|---|---|---|---|---|
| | S2 | −687.87 | | |
| | | | 122.00 | |
| | S3 | 70.34 | | |
| L2 | | | 26.04 | 1.491 57.2 |
| | S4 | 168.61 | | |
| | | | .95 | |
| | S5 | 117.35 | | |
| L3 | | | 18.00 | 1.491 57.2 |
| | S6 | −238.27 | | |
| | | | 34.45 | |
| | S7 | 1954.87 | | |
| L4 | | | 3.00 | 1.491 57.2 |
| | S8 | −1213.46 | | |
| | | | 32.17 | |
| | S9 | −53.86 | | |
| L5 | | | 2.00 | 1.491 57.2 |
| | S10 | Plano | | |

| Aspheric Surfaces: S2,S4,S5,S8,S9 | | | |
|---|---|---|---|
| | S2 | S4 | S5 |
| D | $.155 \times 10^{-6}$ | $.392 \times 10^{-6}$ | $.119 \times 10^{-7}$ |
| E | $-.198 \times 10^{-10}$ | $.116 \times 10^{-9}$ | $-.121 \times 10^{-10}$ |
| F | $.473 \times 10^{-14}$ | $-.158 \times 10^{-13}$ | $.121 \times 10^{-13}$ |
| G | $-.378 \times 10^{-18}$ | $.570 \times 10^{-17}$ | $-.219 \times 10^{-17}$ |
| K | 1.326 | .010 | .010 |

| | S8 | S9 |
|---|---|---|
| D | $.856 \times 10^{-7}$ | $-.366 \times 10^{-5}$ |
| E | $.670 \times 10^{-13}$ | $.194 \times 10^{-8}$ |
| F | $-.215 \times 10^{-13}$ | $-.576 \times 10^{-12}$ |
| G | $-.959 \times 10^{-17}$ | $.335 \times 10^{-17}$ |
| K | .001 | .010 |

EFL = 104.9
Relative Aperture = 1.0 where $N_d$ is the index of refraction of the lens elements, $V_d$ is the dispersion of the lens measured by its Abbe number, S1–S10 are successive lens surfaces, the surfaces where positive are on radii struck from the right and where negative are on radii struck from the left, and surfaces S2, S4, S5, S8 and S9 are aspheric as shown.

24. A lens according to claim 22 defined substantially as follows:

| LENS | | SURFACE RADIUS (mm) | AXIAL DISTANCE BETWEEN SURFACES (mm) | $N_d$ | $V_d$ |
|---|---|---|---|---|---|
| L1 | S1 | 175.713 | | | |
| | | | 13.000 | 1.491 | 57.2 |
| | S1 | 464.585 | | | |
| | | | 79.614 | | |
| L2 | S3 | 85.923 | | | |
| | | | 28.950 | 1.491 | 57.2 |
| | S4 | −4411.900 | | | |
| | | | 39.721 | | |
| L3 | S5 | 78.041 | | | |
| | | | 9.788 | 1.5161 | 80.0 |
| | S6 | 159.040 | | | |
| | | | 6.408 | | |
| L4 | S7 | Plano | | | |
| | | | 5.000 | 1.491 | 57.2 |
| | S8 | 1352.187 | | | |
| | | | 27.319 | | |
| L5 | S9 | −50.861 | | | |
| | | | 3.000 | 1.491 | 57.2 |
| | S10 | Plano | | | |

| Aspheric Surfaces: S1,S4,S8,S9 | | | |
|---|---|---|---|
| S1 | S4 | S8 | S9 |
| D $-.748 \times 10^{-7}$ | $-.930 \times 10^{-7}$ | $.722 \times 10^{-6}$ | $.977 \times 10^{-6}$ |
| E $-.412 \times 10^{-11}$ | $.194 \times 10^{-10}$ | $-.245 \times 10^{-9}$ | $-.423 \times 10^{-9}$ |
| F $-.556 \times 10^{-15}$ | $-.157 \times 10^{-14}$ | $.176 \times 10^{-12}$ | $.182 \times 10^{-12}$ |
| G $.291 \times 10^{-19}$ | $.108 \times 10^{-18}$ | $-.559 \times 10^{-16}$ | $.300 \times 10^{-16}$ |
| K .010 | .010 | .010 | .010 |

EFL = 133.2 mm
Relative Aperture = 1/1.0 where $N_d$ is the index of refraction of the lens elements, $V_d$ is the dispersion of the lens measured by its Abbe number, S1–S10 are successive lens surfaces, the surfaces where positive are on radii struck from the right and where negative are on radii struck from the left, and surfaces S1, S4, S8 and S9 are aspheric as shown.

25. A lens according to claim 22 defined substantially as follows:

| LENS | | SURFACE RADIUS (mm) | AXIAL DISTANCE BETWEEN SURFACES (mm) | $N_d$ | $V_d$ |
|---|---|---|---|---|---|
| L1 | S1 | 283.220 | | | |
| | | | 9.104 | 1.491 | 57.2 |
| | S2 | 665.151 | | | |
| | | | 122.000 | | |
| L2 | S3 | 64.748 | | | |
| | | | 16.052 | 1.491 | 57.2 |
| | S4 | 167.811 | | | |
| | | | 6.168 | | |
| L3 | S5 | 93.902 | | | |
| | | | 19.654 | 1.516 | 80.0 |
| | S6 | −339.234 | | | |
| | | | 24.306 | | |
| L4 | S7 | Plano | | | |
| | | | 5.000 | 1.491 | 57.2 |
| | S8 | 4920.555 | | | |
| | | | 27.314 | | |
| L5 | S9 | −46.061 | | | |
| | | | 2.000 | 1.491 | 57.2 |
| | S10 | Plano | | | |

| Aspheric Surfaces: S2,S4,S8,S9 | | | |
|---|---|---|---|
| S2 | S4 | S8 | S9 |
| D $.967 \times 10^{-7}$ | $.286 \times 10^{-6}$ | $.660 \times 10^{-6}$ | $-.894 \times 10^{-6}$ |
| E $-.372 \times 10^{-12}$ | $.114 \times 10^{-9}$ | $.164 \times 10^{-9}$ | $-.903 \times 10^{-9}$ |
| F $.435 \times 10^{-15}$ | $-.241 \times 10^{-13}$ | $-.332 \times 10^{-13}$ | $.201 \times 10^{-11}$ |
| G $.875 \times 10^{-19}$ | $.675 \times 10^{-17}$ | $.327 \times 10^{-16}$ | $-.116 \times 10^{-14}$ |
| K 1.326 | .010 | .010 | .010 |

EFL = 102.4 mm
Relative Aperture = 1/1.13 where $N_d$ is the index of refraction of the lens elements, $V_d$ is the dispersion of the lens measured by its Abbe number, S1–S10 are successive lens surfaces, the surfaces where positive are on radii struck from the right and where negative are on radii struck from the left, and surfaces S2, S4, S8 and S9 are aspheric as shown.

26. A lens according to claim 22 defined substantially as follows:

| LENS | | SURFACE RADIUS (mm) | AXIAL DISTANCE BETWEEN SURFACES (mm) | $N_d$ | $V_d$ |
|---|---|---|---|---|---|
| L1 | S1 | 219.098 | | | |
| | | | 9.104 | 1.491 | 57.2 |
| | S2 | 373.597 | | | |
| | | | 122.000 | | |
| L2 | S3 | 67.227 | | | |
| | | | 16.052 | 1.491 | 57.2 |
| | S4 | 178.945 | | | |
| | | | 5.068 | | |

-continued

| LENS | | SURFACE RADIUS | AXIAL DISTANCE BETWEEN SURFACES | $N_d$ | $V_d$ |
|---|---|---|---|---|---|
| L3 | S5 | 93.902 | | | |
| | | | 19.654 | 1.516 | 80.0 |
| | S6 | −339.234 | | | |
| | | | 28.029 | | |
| L4 | S7 | Plano | | | |
| | | | 5.000 | 1.491 | 57.2 |
| | S8 | 819.971 | | | |
| | | | 27.411 | | |
| L5 | S9 | −49.111 | | | |
| | | | 2.000 | 1.491 | 57.2 |
| | S10 | Plano | | | |

| Aspheric Surfaces: S2,S4,S8,S9 | | | | |
|---|---|---|---|---|
| | S2 | S4 | S8 | S9 |
| D | $.817 \times 10^{-7}$ | $.331 \times 10^{-6}$ | $.607 \times 10^{-6}$ | $-.128 \times 10^{-5}$ |
| E | $.251 \times 10^{-11}$ | $.571 \times 10^{-10}$ | $.632 \times 10^{-9}$ | $-.912 \times 10^{-10}$ |
| F | $.466 \times 10^{-15}$ | $-.496 \times 10^{-14}$ | $-.541 \times 10^{-12}$ | $.906 \times 10^{-12}$ |
| G | $.312 \times 10^{-20}$ | $.320 \times 10^{-17}$ | $.270 \times 10^{-15}$ | $-.690 \times 10^{-15}$ |
| K | 1.326 | .010 | .010 | .010 |

EFL = 102.3 mm
Relative Aperture = 1/1.13 where $N_d$ is the index of refraction of the lens elements, $V_d$ is the dispersion of the lens measured by its Abbe number, S1–S10 are successive lens surfaces, the surfaces where positive are on radii struck from the right and where negative are on radii struck from the left, and surfaces S1, S4, S8 and S9 are aspheric as shown.

27. A lens according to claim 22 defined substantially as follows:

| LENS | | SURFACE RADIUS (mm) | AXIAL DISTANCE BETWEEN SURFACES (mm) | $N_d$ | $V_d$ |
|---|---|---|---|---|---|
| L1 | S1 | 295.368 | | | |
| | | | 9.104 | 1.491 | 57.2 |
| | S2 | 774.508 | | | |
| | | | 122.000 | | |
| L2 | S3 | 66.132 | | | |
| | | | 20.712 | 1.491 | 57.2 |
| | S4 | 303.415 | | | |
| | | | 5.397 | | |
| L3 | S5 | 114.519 | | | |
| | | | 12.406 | 1.491 | 57.2 |
| | S6 | −781.546 | | | |
| | | | 29.954 | | |
| L4 | S7 | Plano | | | |
| | | | 5.000 | 1.491 | 57.2 |
| | S8 | −609.533 | | | |
| | | | 29.426 | | |
| L5 | S9 | −47.954 | | | |
| | | | 2.000 | 1.491 | 57.2 |
| | S10 | Plano | | | |

| Aspheric Surfaces: S2,S3,S6,S8,S9 | | | |
|---|---|---|---|
| | S2 | S3 | S6 |
| D | $.104 \times 10^{-6}$ | $-.115 \times 10^{-6}$ | $.223 \times 10^{-6}$ |
| E | $-.150 \times 10^{-10}$ | $-.312 \times 10^{-10}$ | $.948 \times 10^{-10}$ |
| F | $.375 \times 10^{-14}$ | $.457 \times 10^{-14}$ | $-.475 \times 10^{-13}$ |
| G | $-.264 \times 10^{-18}$ | $-.311 \times 10^{-17}$ | $.894 \times 10^{-17}$ |
| K | 1.326 | .010 | .010 |

| | S8 | S9 |
|---|---|---|
| D | $.276 \times 10^{-6}$ | $-.349 \times 10^{-5}$ |
| E | $.218 \times 10^{-9}$ | $.329 \times 10^{-8}$ |
| F | $-.119 \times 10^{-12}$ | $.141 \times 10^{-11}$ |
| G | $.146 \times 10^{-16}$ | $.111 \times 10^{-16}$ |
| K | .010 | .010 |

EFL = 102.36 mm
Relative Aperture = 1/1.13 where $N_d$ is the index of refraction of the lens elements, $V_d$ is the dispersion of the lens measured by its Abbe number, S1–S10 are successive lens surfaces, the surfaces where positive are on radii struck from the right and where negative are on radii struck from the left, and surfaces S2, S3, S6, S8 and S9 are aspheric as shown.

28. A lens according to claim 22 defined substantially as follows:

| LENS | | SURFACE RADIUS (mm) | AXIAL DISTANCE BETWEEN SURFACES (mm) | $N_d$ | $V_d$ |
|---|---|---|---|---|---|
| L1 | S1 | 319.058 | | | |
| | | | 9.104 | 1.491 | 57.2 |
| | S2 | 1175.302 | | | |
| | | | 122.000 | | |
| L2 | S3 | 63.931 | | | |
| | | | 20.712 | 1.491 | 57.2 |
| | S4 | 257.432 | | | |
| | | | .200 | | |
| L3 | S5 | 114.519 | | | |
| | | | 12.406 | 1.491 | 57.2 |
| | S6 | −781.546 | | | |
| | | | 27.255 | | |
| L4 | S7 | Plano | | | |
| | | | 5.000 | 1.491 | 57.2 |
| | S8 | −609.533 | | | |
| | | | 29.426 | | |
| L5 | S9 | −49.370 | | | |
| | | | 2.000 | 1.491 | 57.2 |
| | S10 | Plano | | | |

| Aspheric Surfaces: S2,S3,S6,S8,S9 | | | |
|---|---|---|---|
| | S2 | S3 | S6 |
| D | $.104 \times 10^{-6}$ | $-.908 \times 10^{-7}$ | $.223 \times 10^{-6}$ |
| E | $-.125 \times 10^{-10}$ | $-.305 \times 10^{-10}$ | $.948 \times 10^{-10}$ |
| F | $.398 \times 10^{-14}$ | $.392 \times 10^{-14}$ | $-.475 \times 10^{-13}$ |
| G | $-.354 \times 10^{-18}$ | $-.310 \times 10^{-17}$ | $.894 \times 10^{-17}$ |
| K | 1.326 | .010 | .010 |

| | S8 | S9 |
|---|---|---|
| D | $.276 \times 10^{-6}$ | $-.354 \times 10^{-5}$ |
| E | $.218 \times 10^{-9}$ | $.281 \times 10^{-8}$ |
| F | $-.119 \times 10^{-12}$ | $-.167 \times 10^{-11}$ |
| G | $.146 \times 10^{-16}$ | $.407 \times 10^{-16}$ |
| K | .010 | .010 |

EFL = 104.3 mm
Relative Aperture = 1/1.10 where $N_d$ is the index of refraction of the lens elements, $V_d$ is the dispersion of the lens measured by its Abbe number, S1–S10 are successive lens surfaces, the surfaces where positive are on radii struck from the right and where negative are on radii struck from the left, and surfaces S2, S3, S6, S8 and S9 are aspheric as shown.

29. A projection lens from the image end consisting of a first lens unit serving to provide correction for aperture dependent aberrations, said first lens unit consisting of a single element, a second lens unit having convex image and object side surfaces and providing substantially all of the positive power of the overall lens, and a third negative lens unit having a concave image side surface and providing correction for field curvature, said second lens unit consisting of two elements, one of said elements of said second lens unit being biconvex and defining a meniscus shaped air gap with the other element.

30. The lens of claim 29 where said two elements of said second lens unit from the image end have optical powers $K_2$ and $K_3$, respectively, and $$1.8 > K_2/K_3 > 0.6.$$

31. The lens of claim 29 where said meniscus shaped air gap is of negative form.

32. A lens according to claim 29 where the elements of said second lens unit have facing surfaces $S_4$ and $S_5$ where $S_4$ is the object side surface of the image side element and $S_5$ is the image side surface of the object side element, said surfaces $S_4$ and $S_5$ having curvatures $C_4$ and $C_5$, respectively, at the optical axis and $$1.0 > C_4/C_5 > 0.03.$$

33. A lens according to claim 29 where a thin element having at least one aspheric surface is disposed between said second and third lens unit.

34. The lens of claim 33 where said thin element forms part of said third lens unit.

35. The lens of claim 34 where said thin element has substantially the same absolute optical power or less as said first lens unit.

36. The lens of claim 29 where at least one of the facing surfaces of said elements of said second lens unit is aspheric.

37. The lens of claim 29 where the axial air spacing between said first and second lens units is at least 0.4 of the equivalent focal length of said lens.

38. The lens of claim 29 where the axial air spacing between said first and second lens units is greater than the equivalent focal length of said lens.

39. A projection lens from the image end consisting of a first lens unit having an aspheric surface and providing correction for aperture dependent aberrations, said first lens unit consisting of a single element, a second lens unit having convex image and object side surfaces and providing substantially all of the positive power of the overall lens, and a third negative lens unit having a concave image side surface and providing correction for field curvature, said concave surface being aspheric; said second lens unit being overall biconvex and consisting of two elements having facing surfaces defining a meniscus shaped air gap, one of said elements being biconvex.

40. The lens of claim 39 where said two elements of said second lens unit from the image end have optical powers $K_2$ and $K_3$, respectively, and $$1.8 > K_2/K_3 > 0.6.$$

41. The lens of claim 39 where said meniscus shaped air gap is of negative form.

42. A lens according to claim 39 where the elements of said second group have facing surfaces $S_4$ and $S_5$ where $S_4$ is the object side surface of the image side element and $S_5$ is the image side surface of the object side element, said surfaces $S_4$ and $S_5$ having curvatures $C_4$ and $C_5$, respectively, at the optical axis and $$1.0 > C_4/C_5 > 0.03.$$

43. A lens according to claim 39 where a thin element having at least one aspheric surface is disposed between said second and third groups.

44. The lens of claim 43 where said thin element forms part of said third lens unit.

45. The lens of claim 44 where said thin element has substantially the same absolute optical power or less as said first lens unit.

46. The lens of claim 39 where at least one of the facing surfaces of said elements of said second lens unit is aspheric.

47. The lens of claim 39 where the axial air spacing between said first and second lens units is at least 0.4 of the equivalent focal length of said lens.

48. The lens of claim 39 where the axial air spacing between said first and second lens units is greater than the equivalent focal length of said lens.

49. A projection lens from the image end consisting of a first lens unit providing correction for aperture dependent aberrations, a second lens unit air spaced from said first lens unit a substantial percentage of the equivalent focal length of said lens, said second lens unit having convex image and object side surfaces and providing substantially all of the positive power of the overall lens, and a third negative lens unit air spaced from said second lens unit having a concave image side surface and providing correction for field curvature, said second lens unit being overall biconvex and consisting of two elements having facing surfaces defining a meniscus shaped air gap.

50. The lens of claim 49 where the axial air spacing between said first and second lens unit is at least 0.4 of the equivalent focal length of said lens.

51. The lens of claim 49 where the axial air spacing between said first and second lens units is greater than the equivalent focal length of said lens.

52. A projection lens consisting from the image end of a first lens unit of weak optical power having an aspheric surface and providing correction for aperture dependent aberrations, said first lens unit consisting of a single element, a second lens unit having convex image and object side surfaces and providing essentially all of the positive power of the overall lens, and a third negative lens unit having a strongly concave image side surface and serving to provide correction for field curvature; said second lens unit being overall biconvex and consisting of two elements defining a meniscus shaped air gap therebetween, said first, second, and third lens units having optical powers $K_{G1}$, $K_{G2}$, and $K_{G3}$, respectively, the overall lens having an optical power $K_0$, and $$0.3 > K_{G1}/K_0 > -0.05$$

$$1.4 > K_{G2}/K_0 > 0.8$$

$$1.4 > |K_{G3}/K_0| > 0.70$$

said second lens unit having at least one aspheric surface on one of said two elements and said concave surface of said third lens unit being aspheric.

53. The lens of claim 52 where said first and second lens units are axially spaced a distance greater than the equivalent focal length of said lens.

54. A projection lens for a cathode ray tube display of the type consisting of three optical lens units from the image end a first unit of weak optical power having an aspheric surface and providing correction for aperture dependent aberrations, said first lens unit consisting of a single element, a second positive lens unit of strong power having convex image and object side surfaces, and a negative third lens unit having a strongly concave image side surface and providing correction for field curvature, said lens including at least three aspheric surfaces; the overall lens having an optical power $K_0$, and $$1.4 > K_{G2}/K_0 > 0.8$$

$$1.4 > |K_{G3}/K_0| > 0.7$$

where $K_{G2}$ and $K_{G3}$ are the optical powers of said second and third lens units, respectively, and a corrector lens of weak optical power having at least one aspheric surface, said corrector element being positioned between said second and third lens units at least 0.2 of the equivalent focal length of said lens from said second lens unit.

55. The projection lens of claim 54 where said second lens unit includes an element having only spherical surfaces.

56. The projection lens of claim 54 where $$0.3 > K_{G1} > -0.05$$

where $K_{G1}$ is the optical power of said first lens unit.

57. A projection lens consisting from the image end of a first lens unit of weak optical power having an aspheric surface and providing correction for aperture dependent aberrations said first lens unit consisting of a single element, a second lens unit having convex image and object side surfaces and providing essentially all of the positive power of the overall lens, and a third negative lens unit having a strongly concave image side surface and serving to provide correction for field curvature; said second lens unit being overall biconvex and consisting of two elements, said second, and third lens units having optical powers $K_{G2}$ and $K_{G3}$, respectively, the overall lens having an optical power $K_0$, and $$1.4 > K_{G2}/K_0 > 0.8$$

$$1.4 > |K_{G3}/K_0| > 0.70$$

said second lens unit having at least one aspheric surface on one of said two elements and said concave surface of said third lens unit being aspheric, and $$1.0 > C_4/C_5 > 0.1$$

where $C_4$ is the curvature of the object side surface of the image side element of said second lens unit, $C_5$ is the curvature of the object side surface of the object side element of said second lens unit where curvature is the reciprocal of the radius in millimeters.

* * * * *

UNITED STATES PATENT AND TRADEMARK OFFICE
CERTIFICATE OF CORRECTION

PATENT NO.   :   4,697,892
DATED        :   October 6, 1987
INVENTOR(S)  :   ELLIS I. BETENSKY It is certified that error appears in the above-identified patent and that said Letters Patent are hereby corrected as shown below:

IN THE SPECIFICATION

Column 4, Line 18, change "Tables I-IV" to read --Tables I-XV--.

IN THE CLAIMS

Column 13, Line 66, change "$G_{G1}/K_0$" to read --$K_{G1}/K_0$--.

Column 14, Line 24, change "unit" to read --units--.

Column 16, Line 12, under the heading "S2", change ".385 z $10^{-14}$" to read --.385 x $10^{-14}$--.

Column 21, Line 47, under the heading "LENS", change "S1 464.585" to read --S2 464.585--.

Column 25, Line 15, change "unit" to --units--.

Signed and Sealed this

Twenty-second Day of March, 1988

Attest:

DONALD J. QUIGG

Attesting Officer

Commissioner of Patents and Trademarks

/

(12) EX PARTE REEXAMINATION CERTIFICATE (5200th)
United States Patent
Betensky (10) Number: US 4,697,892 C1
(45) Certificate Issued: Sep. 13, 2005

(54) PROJECTION LENS (75) Inventor: Ellis I. Betensky, New York, NY (US)

(73) Assignee: 3M Innovative Properties Company, St. Paul, MN (US)

Reexamination Request:
No. 90/006,991, Apr. 2, 2004

Reexamination Certificate for:
Patent No.: 4,697,892
Issued: Oct. 6, 1987
Appl. No.: 06/642,825
Filed: Aug. 21, 1984

Certificate of Correction issued Mar. 22, 1988.

Related U.S. Application Data

(63) Continuation-in-part of application No. 06/543,017, filed on Oct. 18, 1983, now abandoned.

(51) Int. Cl.$^7$ .............................. G02B 3/00; G02B 9/00
(52) U.S. Cl. ...................... 359/650; 359/708; 359/780

(56) References Cited

U.S. PATENT DOCUMENTS

| | | | | |
|---|---|---|---|---|
| 4,469,413 A | * | 9/1984 | Shirayanagi | 359/718 |
| 4,620,773 A | | 11/1986 | Fukuda | 359/650 |
| 4,753,519 A | | 6/1988 | Miyatake | 359/650 |

* cited by examiner

*Primary Examiner*—Jordan M. Schwartz (57) ABSTRACT

A projection lens for a cathode ray tube display which comprises from the image end, a first group of relatively weak optical power serving primarily to correct aperture dependent aberrations, a second group of strong positive power, and a third negative group having a strongly concave image side surface and which serves as a field flattener and to correct the Petzval curvature of the services of the elements of the other groups. The second group comprises two elements which provide substantially all of the positive power of the lens and which define an air meniscus therebetween with the minor dimension at the optical axis. The optical powers of the second group bear a predetermined ratio and have a minor dimension at the optical axis.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–16, 18–20 and 23–57 is confirmed.

Claims 17, 21 and 22 are cancelled.

\* \* \* \* \*